(12) United States Patent
Iwabuchi

(10) Patent No.: US 11,430,107 B2
(45) Date of Patent: Aug. 30, 2022

(54) INFORMATION PROCESSING APPARATUS, INFORMATION PROCESSING METHOD, AND NON-TRANSITORY COMPUTER READABLE MEDIUM

(71) Applicant: CANON KABUSHIKI KAISHA, Tokyo (JP)

(72) Inventor: Kohei Iwabuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 16/799,486

(22) Filed: Feb. 24, 2020

(65) Prior Publication Data
US 2020/0193582 A1 Jun. 18, 2020

Related U.S. Application Data

(63) Continuation of application No. PCT/JP2018/032750, filed on Sep. 4, 2018.

(30) Foreign Application Priority Data

Sep. 13, 2017 (JP) .............................. JP2017-175806
Aug. 23, 2018 (JP) .............................. JP2018-156331

(51) Int. Cl.
*G06T 7/00* (2017.01)
*G06T 5/40* (2006.01)
*G06T 7/11* (2017.01)

(52) U.S. Cl.
CPC ................ *G06T 7/001* (2013.01); *G06T 5/40* (2013.01); *G06T 7/11* (2017.01); *G06T 2207/30184* (2013.01)

(58) Field of Classification Search
CPC ... G06T 7/001; G06T 7/11; G06T 5/40; G06T 2207/30184
See application file for complete search history.

(56) References Cited

U.S. PATENT DOCUMENTS 8,401,274 B2 * 3/2013 Hazeyama ................ G06T 7/11
382/147
9,241,106 B2 * 1/2016 Kiuchi .................... H04N 5/238
(Continued)

FOREIGN PATENT DOCUMENTS

JP 2000-97871 A 4/2000
JP 2001-156135 A 6/2001
(Continued)

*Primary Examiner* — Gregory M Desire
(74) *Attorney, Agent, or Firm* — Canon U.S.A., Inc. IP Division

(57) ABSTRACT

An information processing apparatus for supporting a user's task for identifying a defect in an object based on a target image that is a photographed image of the object, includes: a selecting unit that selects, based on an user's input, one from one or more reference images to which is referred by the user for identifying a defect in the object; a display unit that comparably displays the target image and the selected reference image on a certain display device; a specifying unit that receives an user's operation for specifying a defect in the target image displayed by the display unit; and a generating unit that generates a new reference image based on a partial area, of the target image, including the specified defect. A new reference image generated by the generating unit is added to the one or more reference images selectable by the selecting unit.

22 Claims, 21 Drawing Sheets

(56) References Cited

U.S. PATENT DOCUMENTS

| | | | |
|---|---|---|---|
| 10,096,103 B2 * | 10/2018 | Sagisaka | H04N 7/188 |
| 2002/0009220 A1 | 1/2002 | Tanaka | |
| 2003/0202703 A1 | 10/2003 | Ogi | |
| 2005/0157170 A1 | 7/2005 | Morishima | |
| 2006/0133660 A1 * | 6/2006 | Ogi | G06T 7/001 |
| | | | 382/149 |
| 2006/0274933 A1 | 12/2006 | Obara | |
| 2017/0358069 A1 * | 12/2017 | Sagisaka | H01L 22/12 |
| 2017/0358070 A1 * | 12/2017 | Sagisaka | G06T 7/001 |
| 2018/0156736 A1 | 6/2018 | Kondo | |
| 2019/0080443 A1 * | 3/2019 | Huang | G06V 10/42 |
| 2020/0193582 A1 * | 6/2020 | Iwabuchi | G06T 7/001 |

FOREIGN PATENT DOCUMENTS

| | | |
|---|---|---|
| JP | 2002-165786 A | 6/2002 |
| JP | 2003-317082 A | 11/2003 |
| JP | 2004-78690 A | 3/2004 |
| JP | 2004-80517 A | 3/2004 |
| JP | 2015-200554 A | 11/2015 |
| JP | 2016-65875 A | 4/2016 |
| WO | 01/41068 A1 | 6/2001 |
| WO | 2016/189764 A1 | 12/2016 |

\* cited by examiner

FIG. 3

| REFERENCE ID | COORDINATES | SIZE (px) | TYPE | CRACK WIDTH (mm) | ZOOM MAGNIFICATION |
|---|---|---|---|---|---|
| 0 | (460,390) | (50,40) | CRACK | 0.2 | 5 |
| 1 | (280,530) | (30,60) | CRACK | 0.5 | 7 |
| | | | | | |

301 302 303 304 305 306

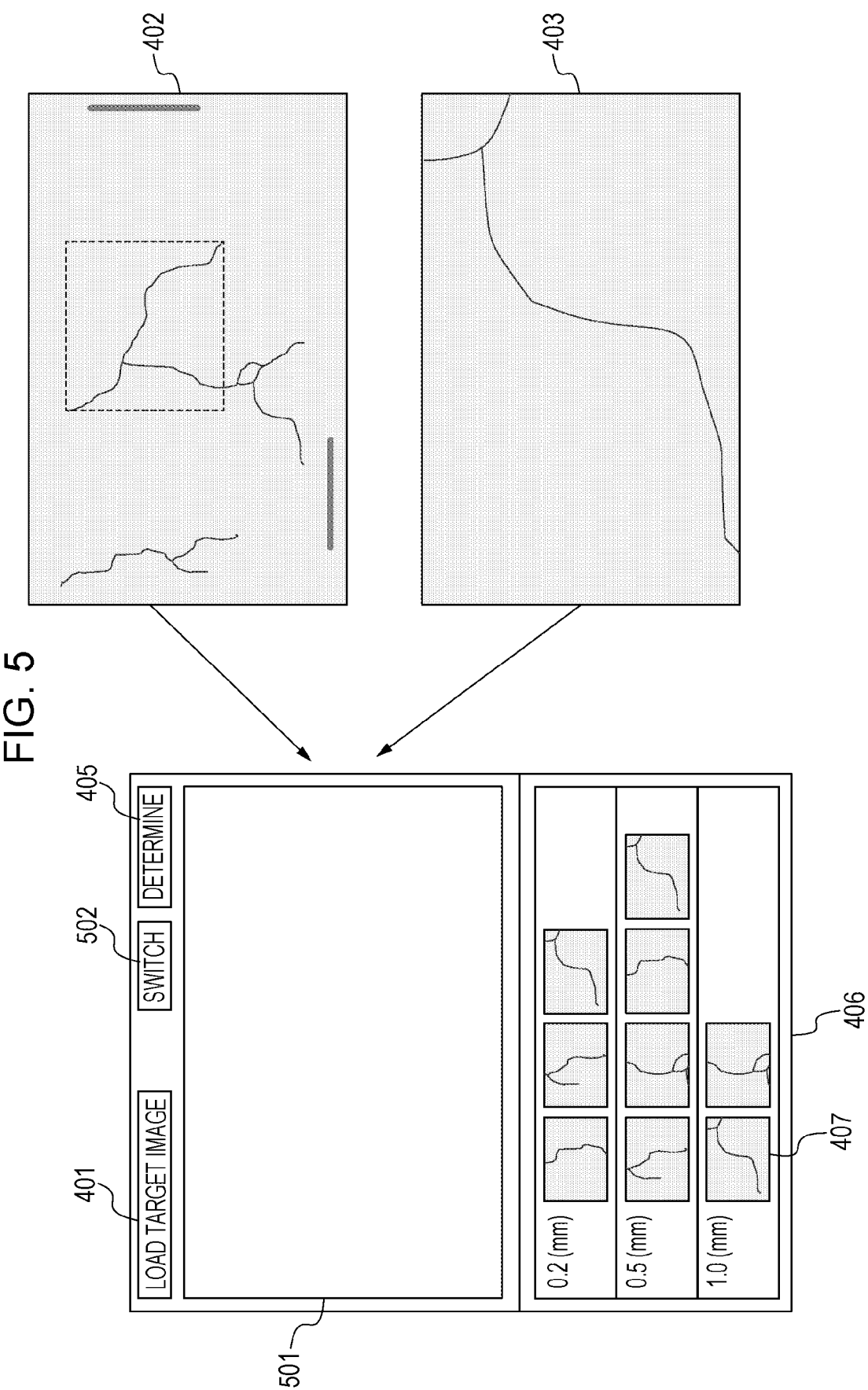

FIG. 11

| REFERENCE ID 301 | IMAGE PATH 1101 | RESOLUTION (px/mm) 1102 | COORDINATES 302 | SIZE (px) 303 | TYPE 304 | CRACK WIDTH (mm) 305 | ZOOM MAGNIFICATION 306 |
|---|---|---|---|---|---|---|---|
| 0 | /xxx/yyy/zzz/image_0.jpg | 2.0 | (460,390) | (50,40) | CRACK | 0.2 | 5 |
| 1 | /xxx/yyy/zzz/image_1.jpg | 1.0 | (280,530) | (30,60) | CRACK | 0.5 | 7 |
| | | | | | | | |

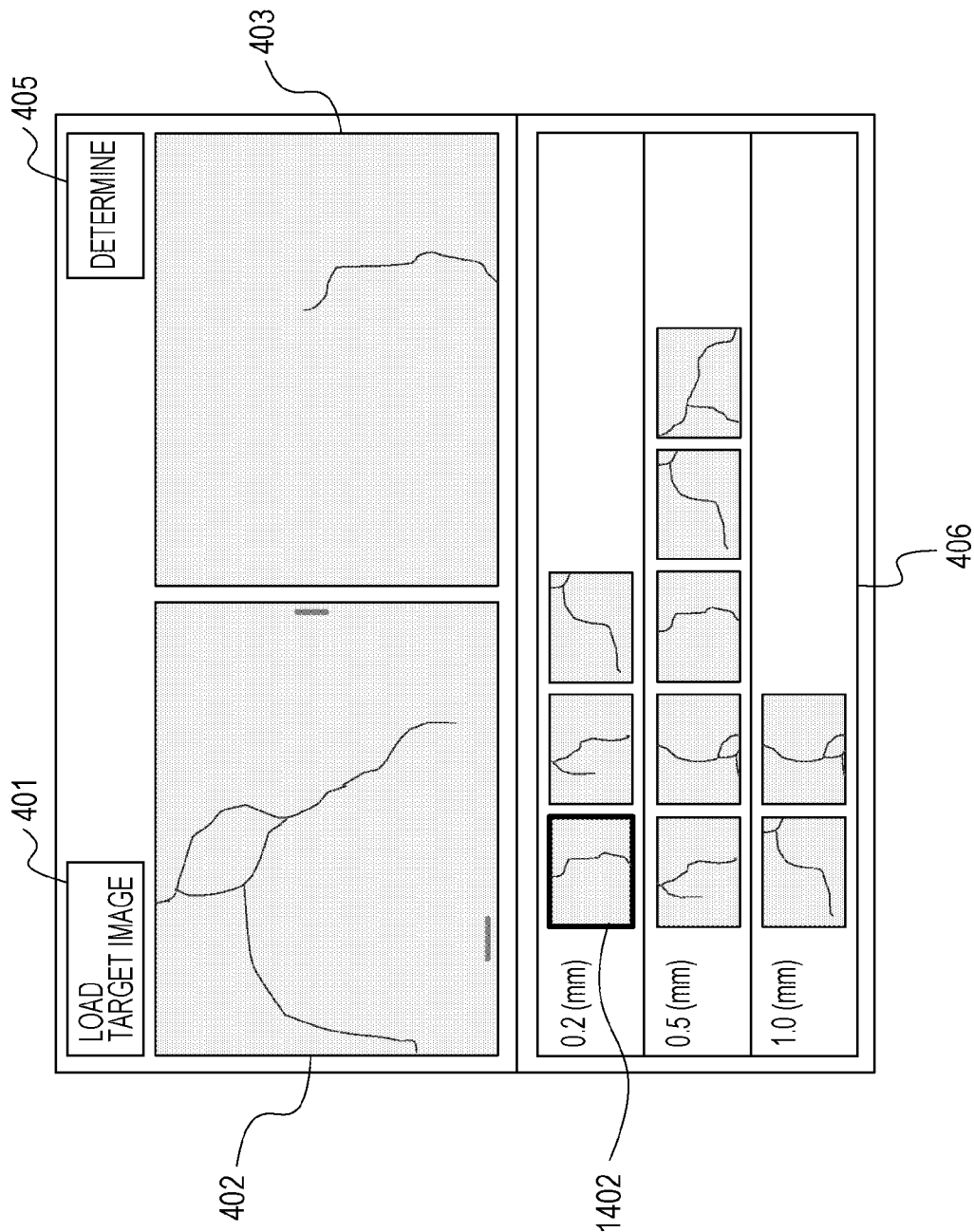

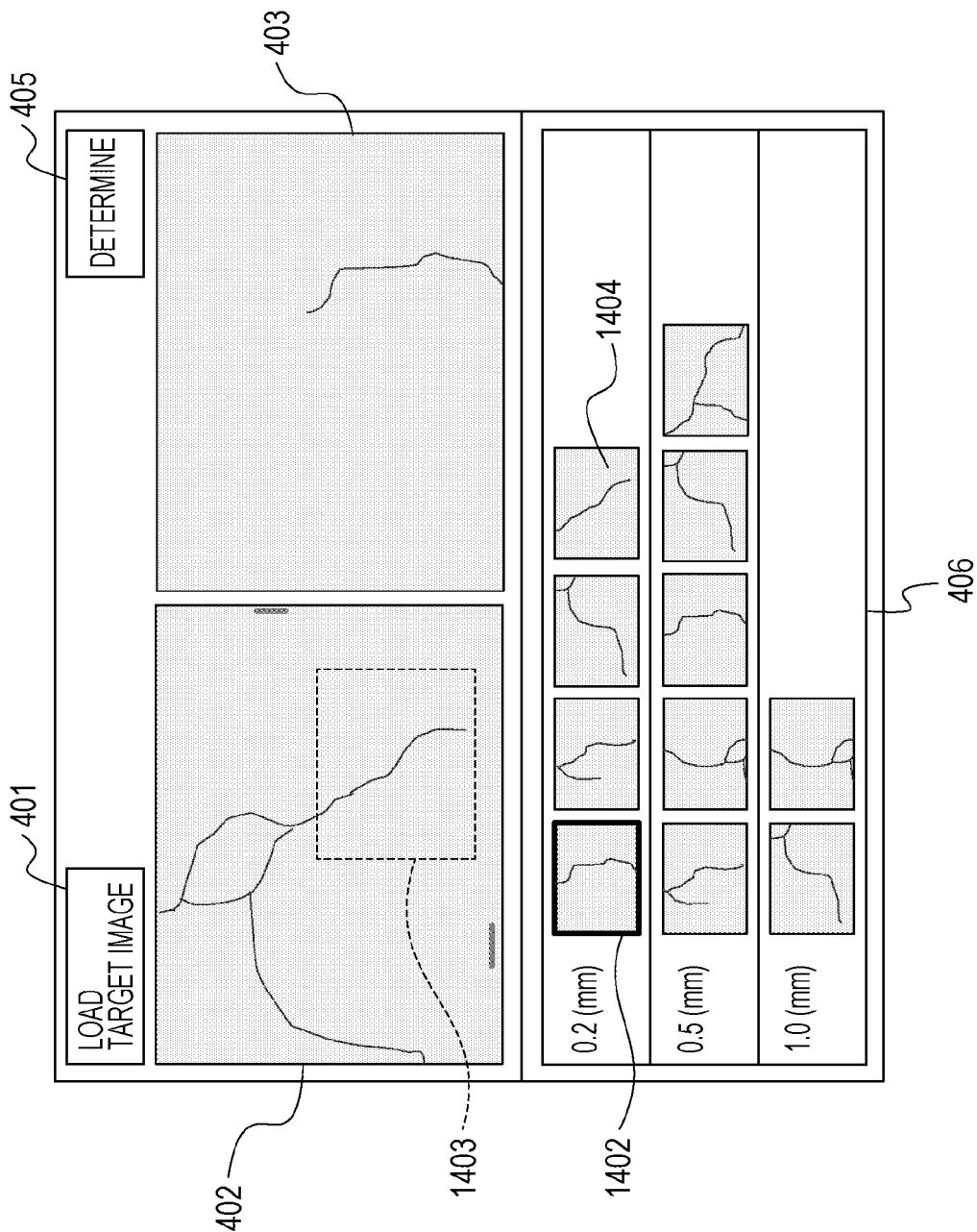

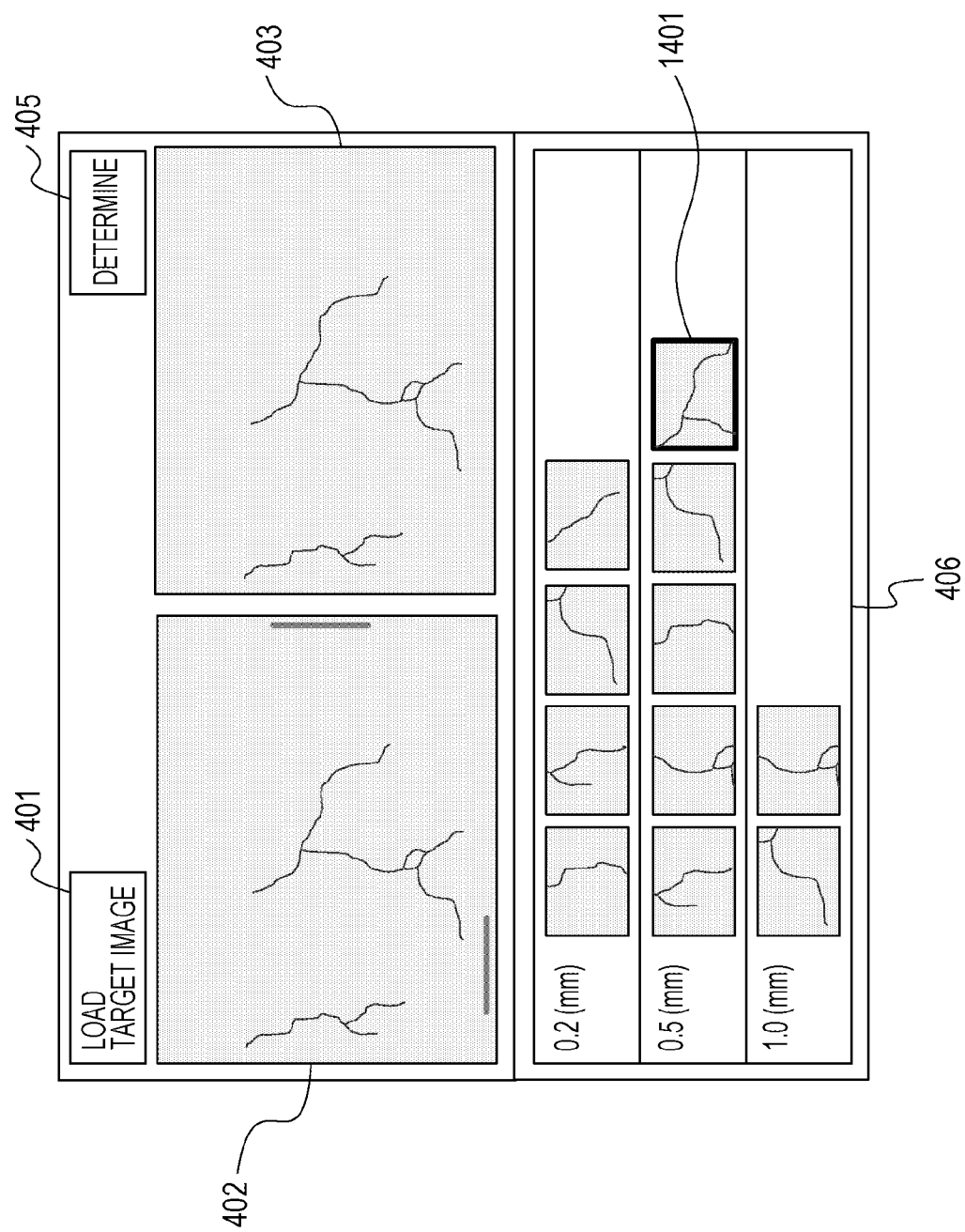

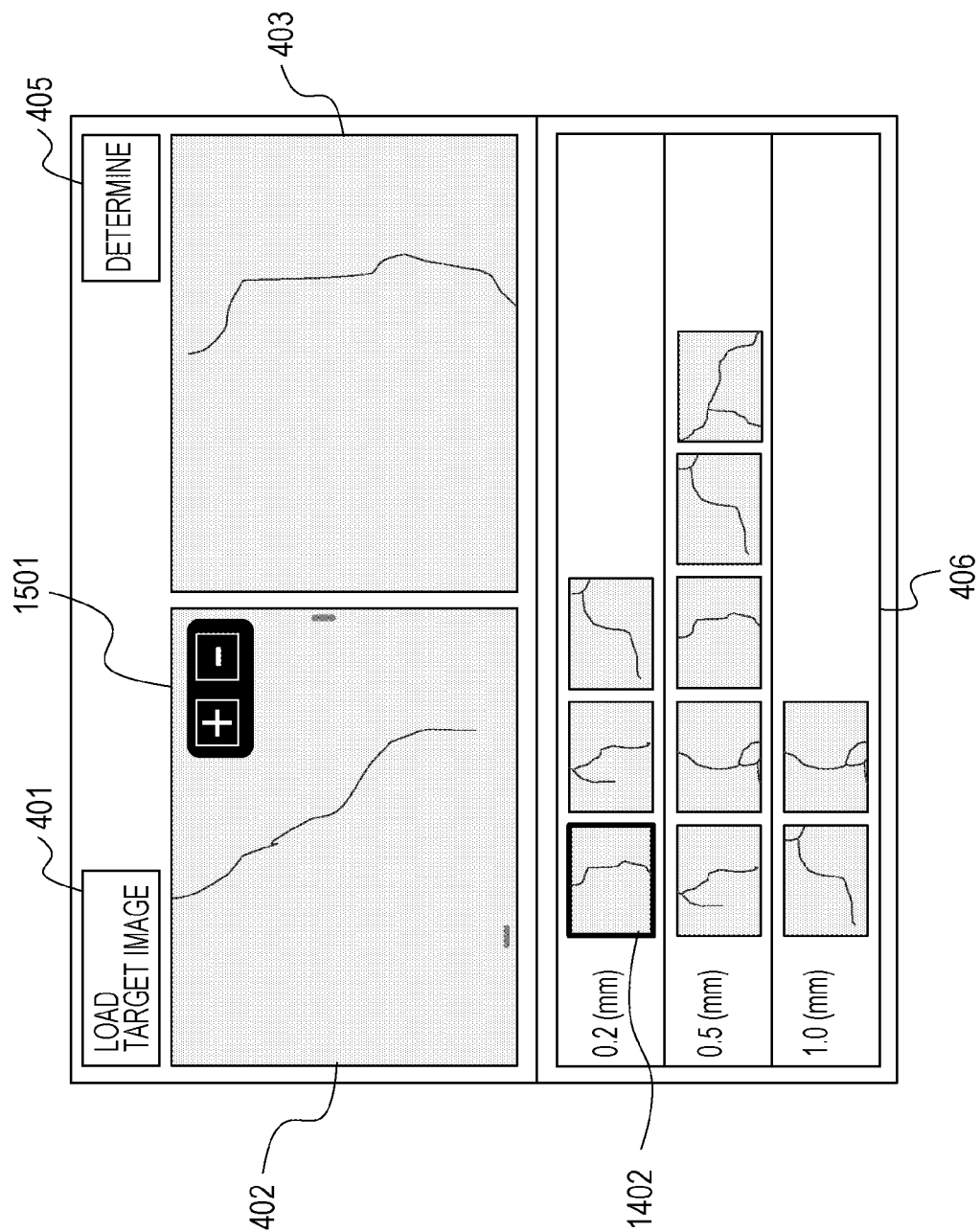

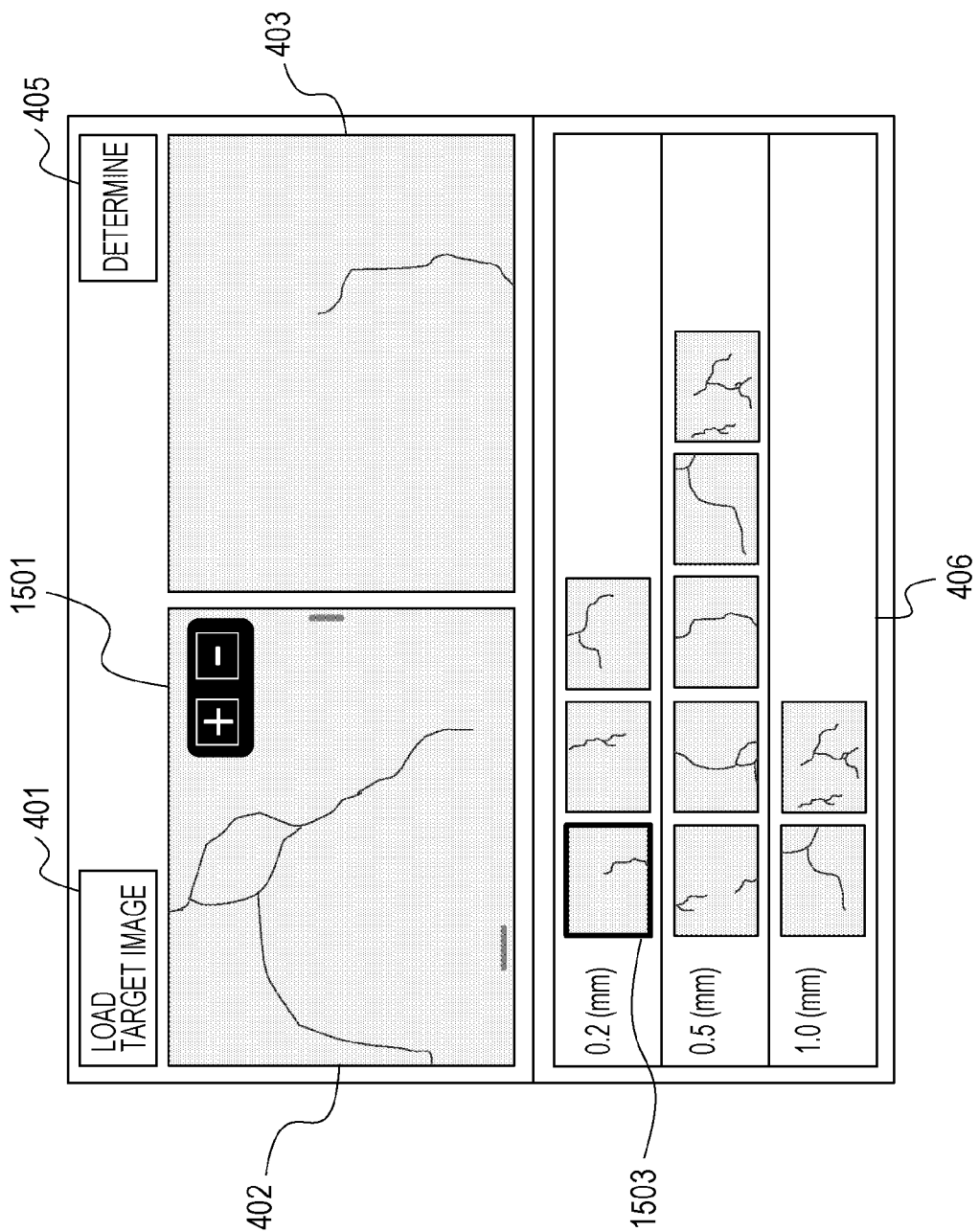

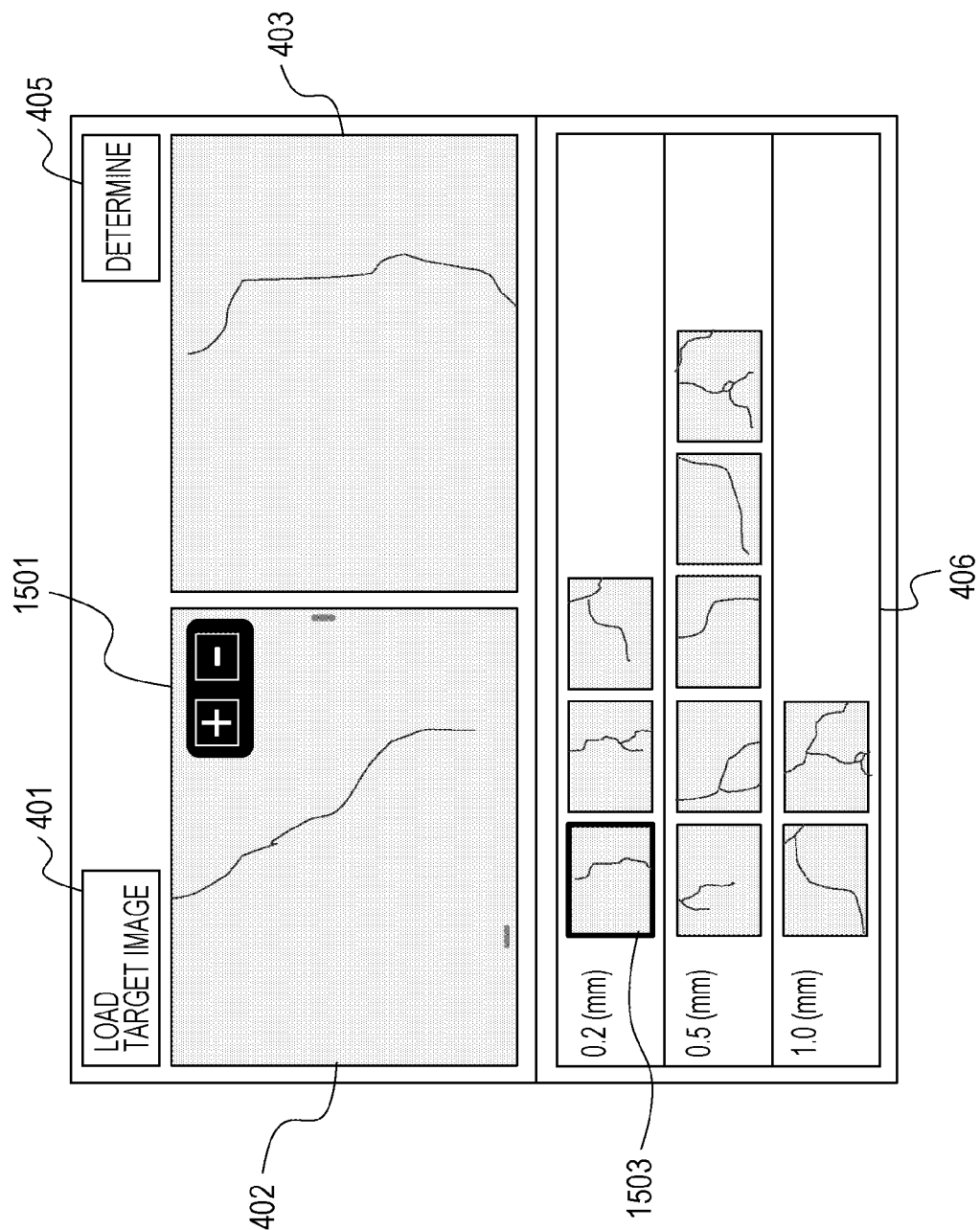

INFORMATION PROCESSING APPARATUS, INFORMATION PROCESSING METHOD, AND NON-TRANSITORY COMPUTER READABLE MEDIUM

CROSS-REFERENCE TO RELATED APPLICATIONS

This application is a Continuation of International Patent Application No. PCT/JP2018/032750, filed Sep. 4, 2018, which claims the benefit of Japanese Patent Application No. 2017-175806, filed Sep. 13, 2017, and Japanese Patent Application No. 2018-156331, filed Aug. 23, 2018, all of which are hereby incorporated by reference herein in their entirety.

TECHNICAL FIELD

The present invention relates to technology used in object inspection work using images.

BACKGROUND ART

To perform inspection work of inspecting an object such as a structure, the inspector visits a site where the structure is situated and takes photographs of the structure. Then, the inspector returns to his/her office, observes the photographed images in detail to determine if there is any defect on the concrete surface, such as cracking, delamination, or spalling, and fills in an inspection form. Here, determination of a defect refers to the act of identifying the type and degree of a defect photographed in the image. For example, for a certain defect, the act of identifying that the defect is the type "crack" and the degree of the defect is "crack width 0.2 (mm)" corresponds to determination of a defect.

When determining a defect, the inspector has difficulty maintaining a certain criterion for determination because the same type and the same degree of defect appears differently depending on the material of the photographed object, the photographing environment, and so forth. When a structure being inspected is large, the inspector often needs to check a huge amount of images. For the above reasons, it is difficult to continuously perform consistent defect determination in structure inspection work, and the determination results tend to vary.

For such an issue related to maintaining a consistent determination criterion in determination and diagnosis of abnormal portions by observing images, PTL 1 discloses a method of comparing, for inspecting an electronic component, an inspection image with a reference image to which reference is made for comparison. In addition, PTL 1 additionally discloses technology for facilitating comparison between a reference image and an inspection image by obtaining a parameter for adjusting the appearance from the reference image and, when photographing the inspection image, photographing is done to match the appearance of the reference image. In addition, PTL 2 discloses technology for facilitating consistent determination by holding a parameter for adjusting the appearance of a lesion in a computed tomography (CT) image as a preset, and applying the preset to adjust the appearance of a specified area of interest.

CITATION LIST

Patent Literature

PTL 1 Japanese Patent Laid-Open No. 2016-65875
PTL 2 Japanese Patent Laid-Open No. 2002-165786

However, the technology disclosed in PTL 1 consumes time and labor because it involves preparation of a reference image for each type and degree of abnormal portion. The technology disclosed in PTL 2 also consumes time and labor because it involves preparation of a parameter preset.

It is an object of the present invention to reduce time and labor spent prior to inspection work.

SUMMARY OF INVENTION

The present invention provides an information processing apparatus including: a display unit that comparably displays a target image that is a photographed image of an object and a reference image that serves as a reference for determining a defect in the object; a specifying unit that allows a user to specify a partial area of the target image which is comparably displayed; and a generating unit that generates a new reference image based on the specified partial area of the target image.

Further features of the present invention will become apparent from the following description of exemplary embodiments with reference to the attached drawings.

BRIEF DESCRIPTION OF DRAWINGS

FIG. 3 is a diagram illustrating a table storing reference information in the first embodiment.

FIG. 5 is a diagram describing an alternative to a screen configuration in the first embodiment.

FIG. 11 is a diagram illustrating a table storing reference information in the third embodiment.

FIG. 14B is a diagram illustrating an example of display state transition.

FIG. 14C is a diagram illustrating an example of display state transition.

FIG. 14D is a diagram illustrating an example of display state transition.

FIG. 15B is a diagram illustrating an example of display state transition.

FIG. 15C is a diagram illustrating an example of display state transition.

FIG. 15D is a diagram illustrating an example of display state transition.

DESCRIPTION OF EMBODIMENTS

Hereinafter, preferred embodiments of the present invention will be described in detail with reference to the accompanying drawings. Note that configurations discussed in the following embodiments are only exemplary, and it shall be noted that the present invention is not limited to these configurations. The embodiments will be described by citing structure inspection work of inspecting a defect in a structure such as a building which serves as an object of inspection by using a photographed image of the structure.

First Embodiment

Figure 1:
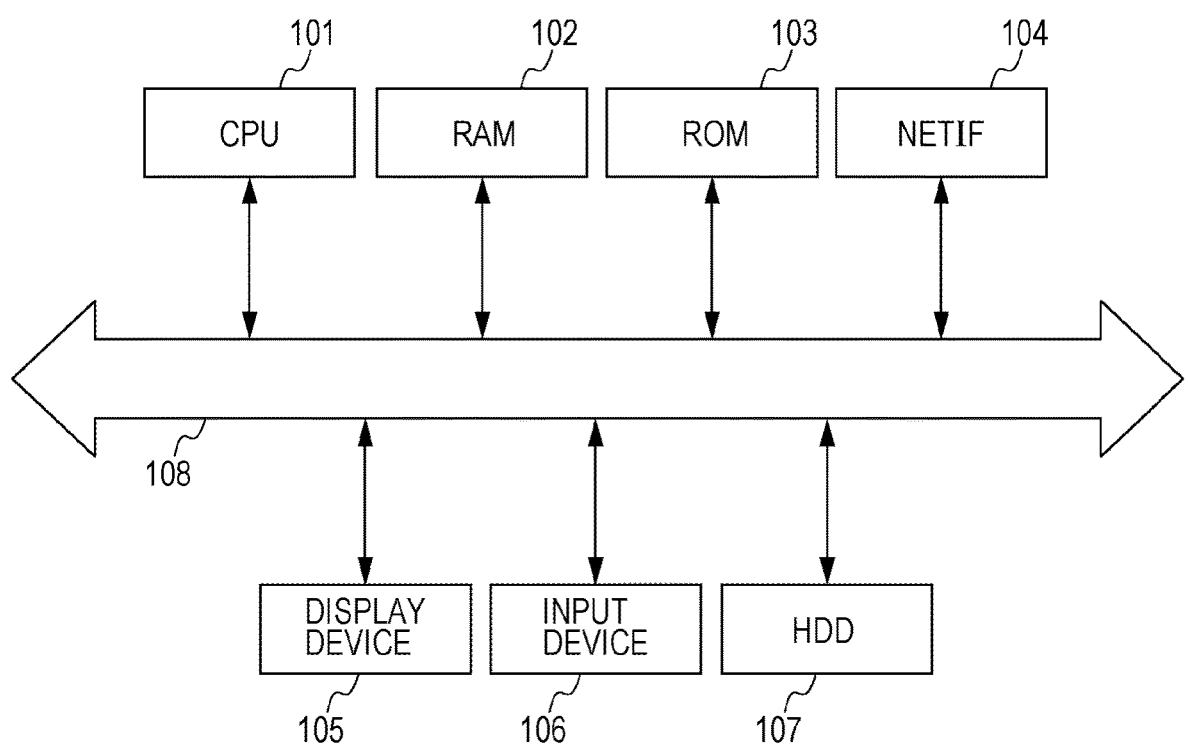
FIG. 1 is a diagram illustrating the overall configuration of an information processing apparatus according to embodiments.

FIG. 1 is a schematic hardware configuration diagram of an information processing apparatus according to a first embodiment. A central processing unit (CPU) 101 controls a computer system. By executing calculation and processing of information and control of hardware components on the basis of control programs and a processing program according to the present embodiment, the CPU 101 realizes various processes including a later-described structure inspection process and configurations of various functional blocks. Random access memory (RAM) 102 functions as, as main memory of the CPU 101, work memory used in loading execution programs and executing the programs. Read-only memory (ROM) 103 records control programs defining operation procedures performed by the CPU 101, and a processing program according to the present embodiment. The ROM 103 includes program ROM that records basic software (operating system (OS)), which is a system program for performing device control of the computer system, and data ROM that records information necessary for activating the system. A later-described hard disk drive (HDD) 107 may be used instead of the ROM 103. A network interface (NET IF) 104 controls input/output of data such as images transmitted/received via a network. A program according to the present embodiment may be downloaded via the NET IF 104 and recorded in the HDD 107 or the like. A display device 105 is, for example, a cathode-ray tube (CRT) display or a liquid crystal display. An input device 106 is an operation input unit for receiving operation inputs from a user, and includes, for example, a touchscreen, a keyboard, and a mouse. The HDD 107 is a storage device. The HDD 107 is used for saving application programs and data such as images. A bus 108 is an input/output bus (address bus, data bus, and control bus) for connecting the above-described units.

Figure 2:
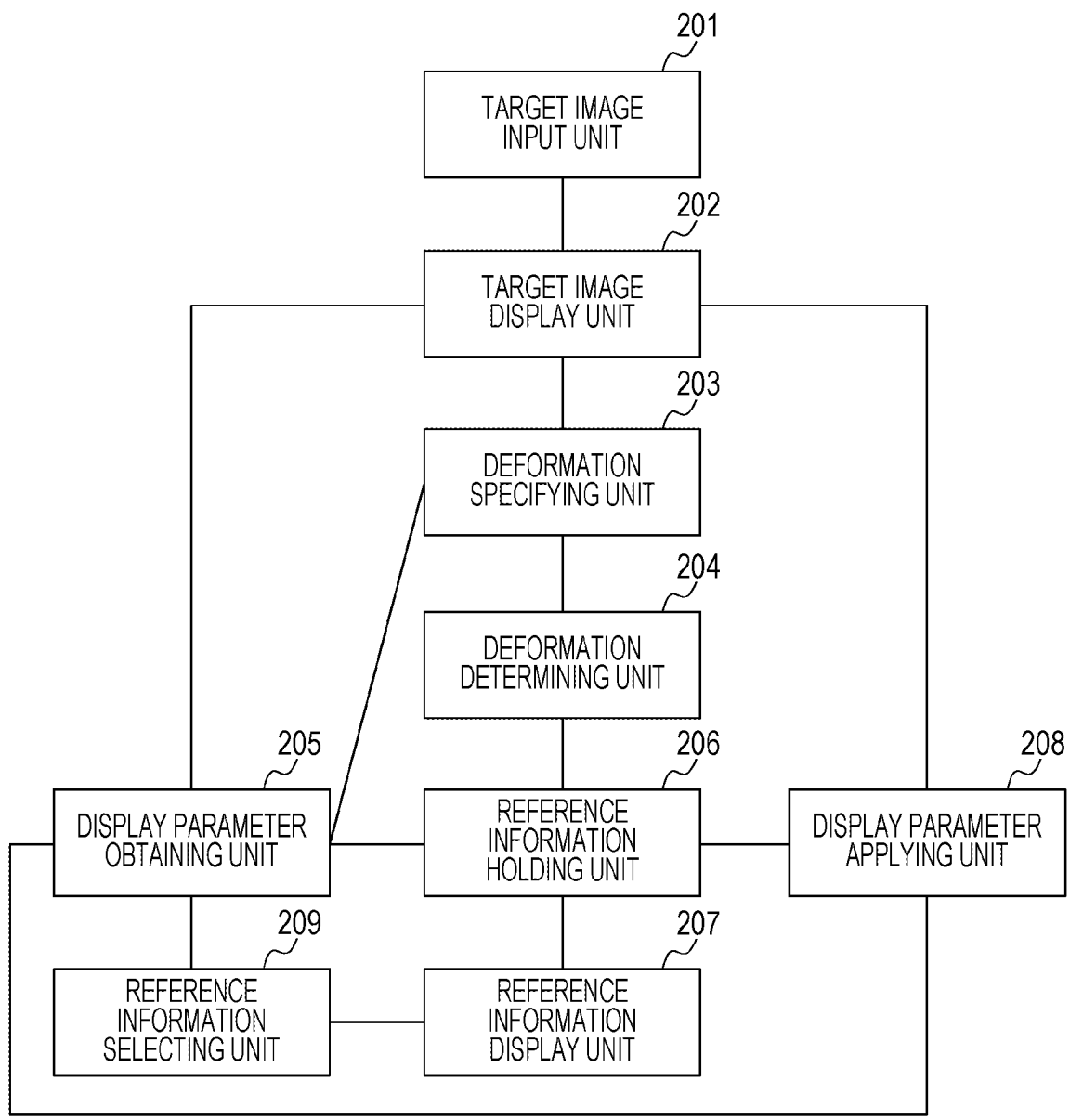
FIG. 2 is a diagram of functional blocks for performing a structure inspection process in a first embodiment.

FIG. 2 is a diagram illustrating functional blocks of the information processing apparatus of the present embodiment for realizing a structure inspection process in the case of inspecting a structure serving as an object of inspection by using a photographed image of the structure. In the present embodiment, execution of the structure inspection process by the functional blocks illustrated in FIG. 2 allows suppression of variations in a criterion for determining a defect in a structure and also reduction of time and labor spent prior to inspection work. The structure inspection process performed by the functional blocks illustrated in FIG. 2 is realized by, for example, executing, by the CPU 101 illustrated in FIG. 1, a program according to the present embodiment and controlling each unit. Note that the functional blocks illustrated in FIG. 2 may be realized by hardware configuration or software configuration, or a combination of hardware configuration and software configuration. The same applies to functional blocks of the later-described embodiments.

A target image input unit 201 obtains a photographed image of a structure to be inspected (hereinafter referred to as a "target image") from the NET IF 104 or the HDD 107.

The target image display unit 202 displays a partial area of the target image, input to the target image input unit 201, in a certain display area of the screen of the display device 105. The partial area is determined by the user by specifying an area of the target image while scrolling and zooming in/out via the input device 106.

A defect specifying unit 203 specifies a defect in the partial area of the target image, displayed by the target image display unit 202, on the basis of an input from the user via the input unit 106. In the present embodiment, a defect includes, for example, cracks, delamination, spalline, efflorescence, cold joints, rock pockets (honeycombs), surface air voids, sand streaks, rust fluids, etc., which occur on the surface of the structure. In the present embodiment, a defect is specified by the user by enclosing an area that seems to be deformed in the target image with a rectangle or an ellipse or by tracing the outline thereof via the input device 106. When a defect is linear as in a crack, the defect may be specified by tracing the linear defect. The defect specifying unit 203 sends information that represents the above-specified defect as a rectangle surrounding the defect, the outline of the defect, or a polyline that traces the defect itself to the target image display unit 202. Accordingly, the target image display unit 202 displays the rectangle surrounding the defect, the outline of the defect, the polyline, or the like on the target image. Because a polyline tends to be of a large amount of data, the defect specifying unit 203 may calculate a circumscribed rectangle of the polyline and send information that represents the deformed area as a rectangle to the target image display unit 202. The defect specified by the rectangle as above is expressed in terms of, for example, the coordinates of the upper left-hand corner of the rectangle and the size (width and height). This enables the position and range to be uniquely identified in the target image. In the present embodiment, it is assumed that a defect is specified by enclosing the defect with a rectangle, as described above. Specific display examples of a partial area of a target image, and a rectangle for specifying a defect in the target image will be described later.

A defect determining unit 204 obtains the result of defect determination input by the user via the input device 106 for a partial area of a target image where a defect has been specified by the defect specifying unit 203. In the present embodiment, the result of defect determination input by the user includes, for example, the type and degree of defect. Specific examples of defect determination performed by the user and its determination result will be described later.

A reference information display unit 207 displays reference information managed by a later-described reference information holding unit 206 on the display device 105. Reference information is information that associates, for a reference image that serves as a reference for determining a defect in a target image, at least information on the type and degree of defect in the reference image. A reference image in the present embodiment includes a partial image of a target image, the partial image including a defect specified by the defect specifying unit 203. Reference information includes information indicating the result of defect determination performed by the defect determining unit 204 in a partial area. In addition, information associated with a reference image may include a display parameter obtained by a later-described display parameter obtaining unit 205 from the reference information holding unit 206, and a display parameter obtained from a partial area specified by the defect specifying unit 203. In the case of the present embodiment, a plurality of items of reference information are held in, for example, the HDD 107 or an external storage device via the NET IF 104, and the reference information holding unit 206 manages these held pieces of reference information.

A reference information selecting unit 209 displays a list of pieces of reference information managed by the reference information holding unit 206 in a certain display area of the display device 105 to prompt the user to select one of these displayed pieces of reference information. The list may be displayed by displaying, side by side, thumbnail images generated by obtaining reference images on the basis of reference information and applying appropriate trimming or size-reduction processing to these reference images, or may be displayed by displaying, side by side, character strings for uniquely identifying reference images. Specific display examples of the list of pieces of reference information will be described later.

In addition, in the case of displaying the list of pieces of reference information, the pieces of reference information may be displayed while being grouped, sorted, or filtered according to the type and degree of defect respectively included in the pieces of reference information. In this case, the reference information selecting unit 209 has a grouping function for grouping a plurality of items of reference information on the basis of the type and degree of defect respectively included in the pieces of reference information, a sorting function for sorting pieces of reference information on the basis of the type and degree of defect respectively included in the pieces of reference information, and a filtering function for filtering pieces of reference information on the basis of the type and degree of defect respectively included in the pieces of reference information.

When the user selects one piece of reference information from the displayed list via the input device 106, the reference information display unit 207 obtains a reference image on the basis of the selected reference information and displays the reference image in a certain display area of the display device 105. Specific examples of displaying the reference image will be described later.

Here, when a partial area of a target image is subjected to defect specification and defect determination, the information processing apparatus of the present embodiment displays the above-mentioned partial area of the target image and the reference image on the display device 105 to enable the user to visually compare the two images. When comparably displaying the partial area of the target image and the reference image, the information processing apparatus of the present embodiment performs adjustment processing to match how the target image and the reference image appear on display (how the two images are displayed). In the first embodiment, adjustment processing to match how the target image and the reference image appear on display is realized by matching how the target image is displayed to how the reference image is displayed.

Therefore, the display parameter obtaining unit 205 obtains a display parameter from a reference image based on reference information selected by the reference information selecting unit 209. Alternatively, when selected reference information already includes a display parameter, the display parameter obtaining unit 205 obtains the display parameter included in the selected reference information from the reference information holding unit 206. In the present embodiment, a display parameter is a parameter used in making uniform how two images that appear differently are displayed and matching how these images appear on display.

In the present embodiment, a target image and a reference image are displayed to be comparable with each other, thereby facilitating comparison between a defect already identified in the reference image and a candidate for a pre-determined defect included in the target image, and supporting a task of determining a defect in the target image. Therefore, "to match how the two images appear on display" in the present embodiment refers to making the display environments of the target image and the reference image uniform in order to facilitate comparison between the target image and the reference image. For example, the zoom magnifications of the two images are made equal. Because the reference image includes the partial image of the target image where a defect has already been determined in the present embodiment, when the zoom magnification of the target image and the zoom magnification of the reference image are made equal, if defects with the same width are photographed in these images, the displayed defects appear to be of the same width. The display parameter will be described in detail later using specific examples with reference to FIG. 6. The display parameter obtaining unit 205 sends the obtained display parameter to a display parameter applying unit 208.

By applying the display parameter to the partial area of the target image, the display parameter applying unit 208 performs image adjustment to match the appearance of the image (reference image) serving as a source from which the display parameter is obtained to the appearance of the image (target image) serving as a destination to which the display parameter is applied. Specific examples of applying the display parameter will be described later.

When a defect is specified and determined in a partial area of a target image, the reference information holding unit 206 of the present embodiment generates information that associates the defect determination result (type and degree of defect) with the partial area as new reference information, and manages the new reference information. The reference information holding unit 206 causes the newly generated reference information to be held in, for example, the HDD 107 or an external storage device via the NET IF 104. That is, in the present embodiment, reference information regarding a partial area of a target image where a defect has been determined by the user is further usable later as reference information when this target image is subjected to defect determination.

FIG. 3 is a diagram illustrating an example of a reference information table used when the reference information holding unit 206 manages reference information held therein. Hereinafter, an example in which, among defects handled in structure inspection, particularly cracks is inspected will be described. In FIG. 3, a reference identification (ID) for uniquely identifying reference information stored in the reference information table is described in a reference ID item 301 of the reference information table. The relative coordinates of a rectangle representing a defect area of the target image are described in a coordinate item 302. Although it is assumed that the relative coordinates of the upper left hand corner of the rectangle in the target image are used as the coordinates described in the coordinate item 302 in the present embodiment, the coordinates are not limited to these coordinates, and may be the coordinates of the center or the lower right hand corner of the rectangle.

The size of a rectangle representing a defect area is described in a size item 303. Here, the size of the rectangle includes the width and the height of the rectangle. A character string representing the type of defect is described in a type item 304. A value representing the degree of defect is described in a degree item 305. The example discussed in the present embodiment cites an example where a crack width is described as a value representing the degree of defect. A display parameter is described in a display parameter item 306. The display parameter is used to, as described above, match the appearance of another image (a partial area in the case of the present embodiment) to that of a reference image identified by the coordinates in the coordinate item 302 and the size in the size item 303. In the present embodiment, the case in which a zoom magnification is adopted as an example of the display parameter will be described by way of example.

Figure 4A:
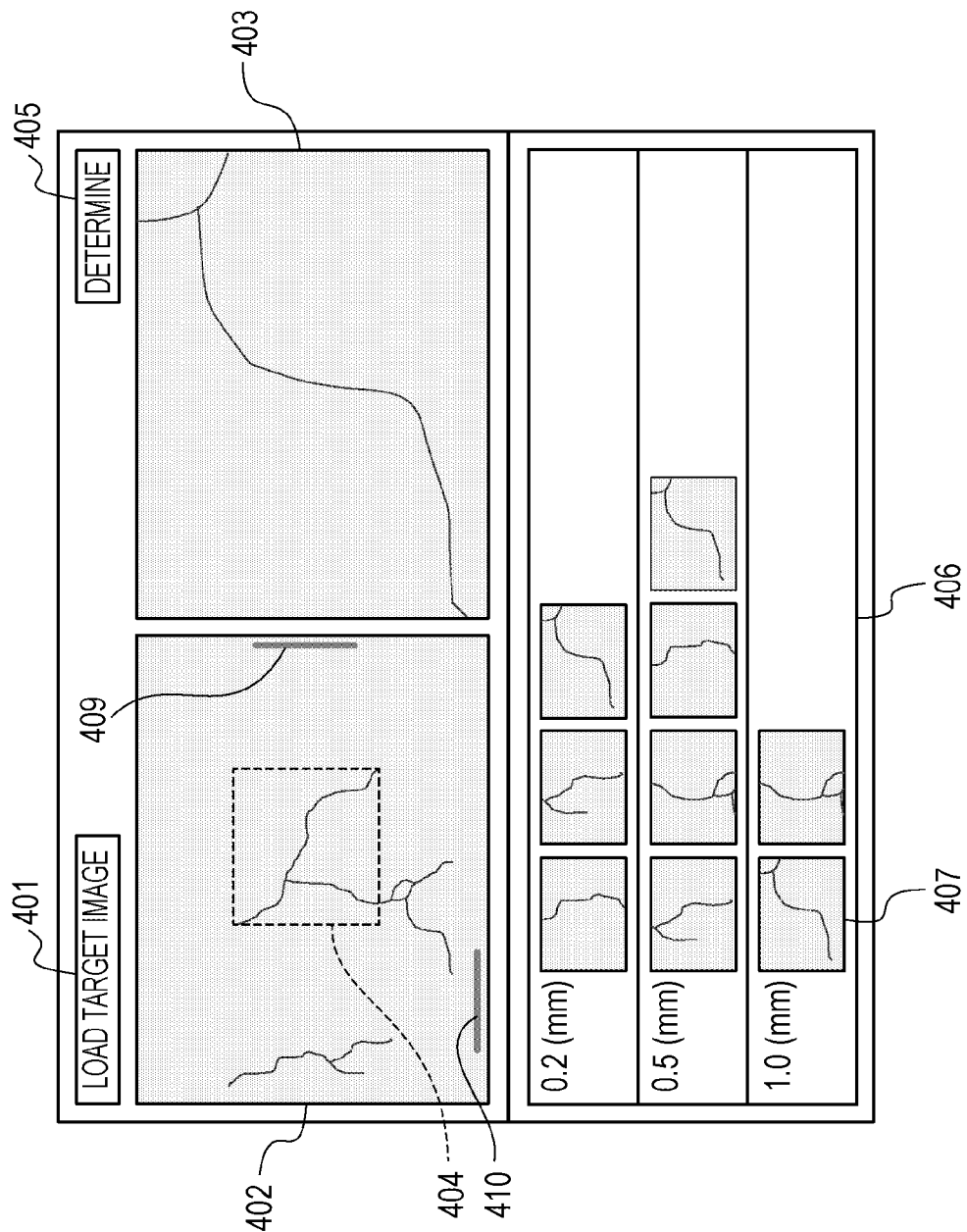
FIG. 4A is a diagram describing a screen configuration in the first embodiment.
Figure 4B:
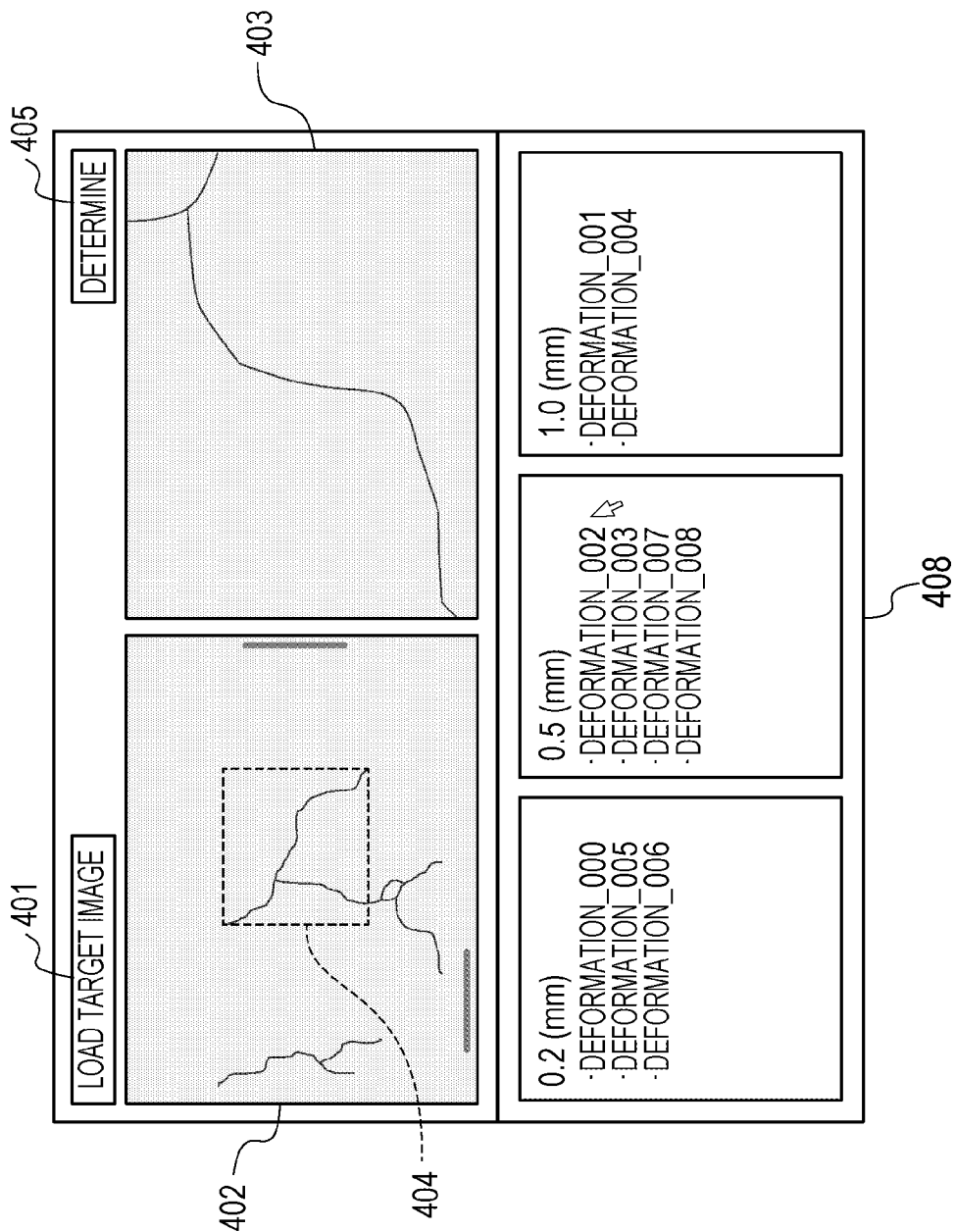
FIG. 4B is a diagram describing a screen configuration in the first embodiment.

FIGS. 4A and 4B are diagrams describing exemplary display of the display device 105 when the information processing apparatus of the present embodiment is executing a structure inspection process. The difference between FIGS. 4A and 4B is that the method of representing a list of items of reference information is different. A target image loading button 401 is a button operated by the user when loading a target image by the target image input unit 201. A target image display area 402 is a display area where a target image is displayed by the target image display unit 202. After obtaining one target image, the user performs a task of determining a defect while scrolling and zooming in/out to move the partial area displayed in the display area 402, thereby inspecting a necessary range of the target image. For example, a scroll bar 409 and a scroll bar 410 are usable for operations for moving the partial area. Other than that, an interface for changing the display parameter, such as a zoom magnification, a brightness adjustment value, a hue adjustment value, or a gamma value, may be displayed in accordance with a certain operation (such as right click or double tap) in the target image display area 402.

A reference image display area 403 is a display area where a reference image is displayed by the reference information display unit 207. A defect area specifying rectangle 404 is a rectangle representing the area of a defect specified by the defect specifying unit 203. A defect determination button 405 is a button operated by the user to input, with the defect determining unit 204, the type and degree of a defect indicated by the defect area specifying rectangle 404. Although omitted in the drawings, at a time point at which the defect determination button 405 is pressed, the information processing apparatus displays a dialogue window or the like for inputting the type and degree of defect on the screen to prompt the user to input the type and degree of defect.

A reference information list area 406 in FIG. 4A is an area where a list of items of reference information managed by the reference information holding unit 206 is displayed. Accordingly, the user may select reference information from the list.

A reference thumbnail image 407 is a thumbnail image representing a reference image, and is generated by appropriately trimming or size-reducing/enlarging a reference image obtained on the basis of reference information. In the example illustrated in FIG. 4A, at a time point at which a defect is determined, a partial image corresponding to the defect area specifying rectangle 404 specified by the defect specifying unit 203 is trimmed and size-reduced to generate a thumbnail image, which is displayed in the reference information list area 406.

FIG. 4A illustrates an example where, on the basis of the type and degree (the crack width of cracks in this example) of defect included in the reference information, the reference thumbnail images 407 are grouped and displayed as a list in the reference information list area 406.

A reference information list area 408 in FIG. 4B is an area where a list of items of reference information managed by the reference information holding unit 206 is displayed. Although a list of thumbnail images representing reference images is displayed in the reference information list area 406 illustrated in FIG. 4A, a list of character strings for uniquely identifying reference images is displayed in the reference information list area 408 in FIG. 4B. An exemplary character string for uniquely identifying a reference image is, for example, the character string "defect_(reference ID)".

FIG. 4B illustrates an example where, on the basis of the type and degree (the crack width of cracks) of defect included in the reference information, character strings for uniquely identifying reference images are grouped and displayed as a list in the reference information list area 408.

Although FIGS. 4A and 4B cite examples in which the target image display area 402 and the reference image display area 403 are displayed side by side to be comparable with each other, the target image display area 402 and the reference image display area 403 may be displayed as illustrated in, for example, FIG. 5. FIG. 5 illustrates a display example where the target image display area 402 and the reference image display area 403 are arranged one above the other in the same area (the same display area) on the screen, and the visible state of the two is switched to enable comparison between the two. In the example illustrated in FIG. 5, an inspection/reference image display area 501 is a display area for switchably displaying the target image display area 402 and the reference image display area 403. Switchable display of the target image display area 402 and the reference image display area 403 in the inspection/reference image display area 501 is performed in accordance with, for example, a switching operation of a toggle button such as an inspection/reference image switching button 502. Note that the target image loading button 401, the defect determination button 405, the reference information list area 406, and the reference thumbnail image 407 in FIG. 5 are the same as those in FIG. 4A.

Hereinafter, a process of making uniform how a target image and a reference image are displayed (a process of matching their appearances) will be described using FIG. 6. In addition, a process of generating new reference information on the basis of the result of defect determination performed by the user will be described using FIG. 7.

Figure 6:
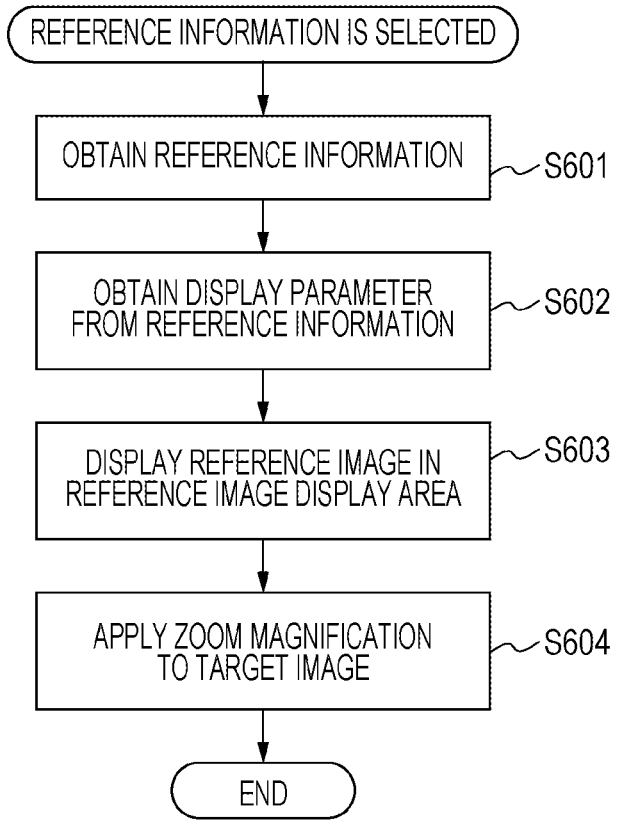
FIG. 6 is a flowchart of an image adjustment process in accordance with selection of reference information.
Figure 7:
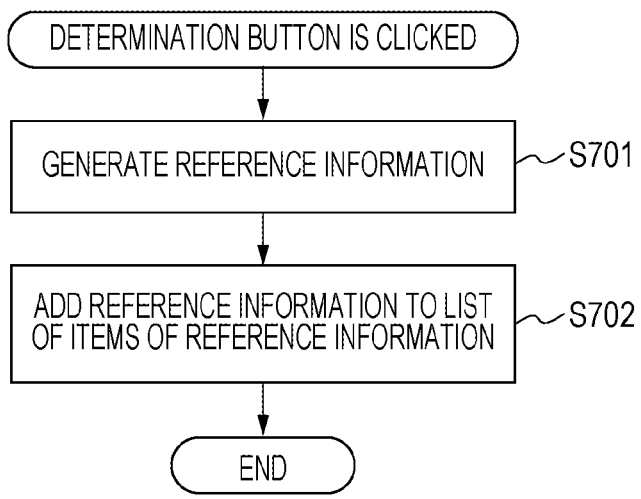
FIG. 7 is a flowchart describing a reference information generating process.

FIG. 6 is a flowchart describing a process executed by the information processing apparatus of the present embodiment when reference information is selected from a list of items of reference information. In the present embodiment, it is assumed that reference information is generated on the basis of a defect in a target image displayed by the target image display unit 202, as will be described later with reference to FIG. 7. It is also assumed that the processes indicated by the flowcharts in FIGS. 6 and 7 are realized by executing, by the CPU 101 in FIG. 1, a program according to the present embodiment. In addition, step S601 to step S604, step S701, and step S702 will be abbreviated as S601 to S604, S701, and S702 in the following description. The same applies to the other flowcharts described later.

In S601, when the user selects any one of the thumbnail images or the character strings in the above-mentioned reference information list area (406 or 408), the reference information selecting unit 209 obtains reference information in accordance with the selection from the reference information holding unit 206.

Next, in S602, the display parameter obtaining unit 205 obtains a display parameter from the reference information obtained in S601. Here, the above-mentioned zoom magnification is obtained as an example of the display parameter.

Next, in S603, the reference information display unit 207 displays a reference image in the reference image display area 403 on the basis of the reference information obtained in S601. At this time, the reference information display unit 207 first obtains the coordinates of the upper left-hand corner and the size of a rectangle surrounding a defect from the selected reference information. The reference information display unit 207 cuts out, from an image serving as a source from which reference information is generated (that is, a target image displayed by the target image display unit 202), a rectangular image on the basis of the coordinates of the upper left hand corner and the size of the rectangle. Furthermore, the reference information display unit 207 applies the zoom magnification obtained in S602 by the display parameter obtaining unit 205 to the cut-out rectangular image to reproduce the manner of displaying at a time at which a defect is determined upon generation of reference information. Reproducing the manner of displaying may be realized by applying a scale transformation matrix generated on the basis of the zoom magnification to the cut-out rectangular image. The reference information display unit 207 displays the rectangular image, whose manner of displaying has been reproduced, as a reference image in the reference image display area 403.

In the present embodiment, when a rectangular image reproducing how a rectangle (inside the defect area specifying rectangle 404) surrounding a defect is displayed upon generation of reference information is smaller than the reference image display area 403, the area around the rectangle surrounding the defect is additionally displayed. As a result, in response to selection of the reference thumbnail image 407, a reference image displayed in the reference image display area 403 becomes a portion displayed in the entirety of the target image display area 402 at the time a defect is determined in the target image. However, the case is not limited to the above. For example, a rectangle surrounding a defect upon generation of reference information may be displayed to be positioned at the center of the reference image display area 403. Alternatively, when a rectangle surrounding a defect is smaller than the reference image display area 403, the area outside the rectangle may be left blank.

Next, in S604, the display parameter applying unit 208 applies the zoom magnification obtained in S602 by the display parameter obtaining unit 205 to the target image displayed by the target image display unit 202, thereby reproducing the manner of displaying which is the same as that of the reference image. Accordingly, image adjustment for matching the appearance of the target image and the reference image (display parameter) is realized. In this case, as in the above-described case, a scale transformation matrix generated on the basis of the zoom magnification may be applied to the target image. When the selected reference image is a partial image of the target image, defects having an identical width that are photographed in the target image and the reference image also have the same apparent width on the display device by matching the zoom magnification of the target image and the zoom magnification of the reference image. However, in the present embodiment, even after the reference image is selected and the display parameter of the target image is changed by the information processing apparatus, the user may move the displayed partial area by scrolling and zooming in/out to change the zoom magnification. For example, after checking that a defect having the same width as a referenced defect is included in the target image since the target image is displayed at the same zoom magnification as that of the reference image, the user may check the length of the defect by arbitrarily zooming out. When the defect is determined in an arbitrarily zoomed out state, the zoom magnification finely adjusted by this zooming out is held as reference information of a reference image newly generated in accordance with the determination. In the first embodiment, when the display parameter of the target image is changed by the user, that change does not affect the reference image.

Although the present embodiment has discussed the example of matching how the target image and the reference image appear by making the zoom magnification uniform for the target image and the reference image, a display parameter other than a zoom magnification may be used. A display parameter in this case includes, for example, a brightness adjustment value, a hue adjustment value, or a gamma value. A display parameter to be used is not restricted to any one of a zoom magnification, a brightness adjustment value, a hue adjustment value, and a gamma value, and may be a combination thereof.

For example, when a brightness adjustment value is used as a display parameter, in S602, the display parameter obtaining unit 205 obtains brightness from the reference image and generates a brightness adjustment value. In S604, the display parameter applying unit 208 may simply adjust the brightness of the target image by using the brightness adjustment value. When, for example, the hue, saturation, value (HSV) color space is used, the maximum one among red, green, and blue (RGB) becomes a brightness adjustment value V, and the display parameter applying unit 208 in this case matches a brightness adjustment value Vi of the target image to a brightness adjustment value Vr of the reference image. In this case, values other than the brightness adjustment value Vi of the target image (for example, if R is Vi, then G and B) also need to be changed in accordance with a change in Vi without changing the ratio of RGB before the change. Whichever display parameter is used, the environment for displaying the target image and the display image may be arranged to facilitate comparison between a defect already identified in the reference image and a candidate for a pre-determined defect included in the target image.

In the present embodiment, the above-described process is performed every time reference information is selected from the list of items of reference information.

FIG. 7 is a flowchart describing a process of generating new reference information, which is executed by the information processing apparatus of the present embodiment in response to pressing of the defect determination button 405. In S701, when the defect determination button 405 is pressed, the defect determining unit 204 generates information indicating a partial area of a target image where a defect is determined at that time, and the type and degree of the defect as new reference information, and stores the new reference information in the reference information holding unit 206. In this case, the reference information holding unit 206 describes reference information in each item of the above-mentioned reference information table illustrated in FIG. 3. In addition, the reference information at this time includes the zoom magnification of the target image at present, which is obtained by the display parameter obtaining unit 205.

Depending on the type of display parameter, it is not always necessary to obtain and save a display parameter at this time point. For example, in the case of a brightness adjustment value described above as an example of the display parameter, a brightness adjustment value may be calculated at the time of generating reference information and may be saved as part of the reference information; however, a brightness adjustment value may be calculated at a time point at which a reference image is selected.

Next, in S702, the reference information display unit 207 additionally displays a display element generated on the basis of the reference information generated in S701 in the reference information list area 406 illustrated in FIG. 4A. Specifically, the reference information display unit 207 resizes a defect portion of a reference image generated on the basis of the new reference information to, for example, the size of a thumbnail image, and additionally displays the resized defect portion in the reference information list area 406. Alternatively, the reference information display unit 207 may generate an appropriate character string based on a reference ID indicating the reference information, and additionally display the character string in, for example, the reference information list area 408 illustrated in FIG. 4B.

Note that the flowchart illustrated in FIG. 7 may be activated not only at a time point at which the defect determination button 405 is pressed, but also at an arbitrary time point, such as when the user specifies a defect.

Figure 14A:
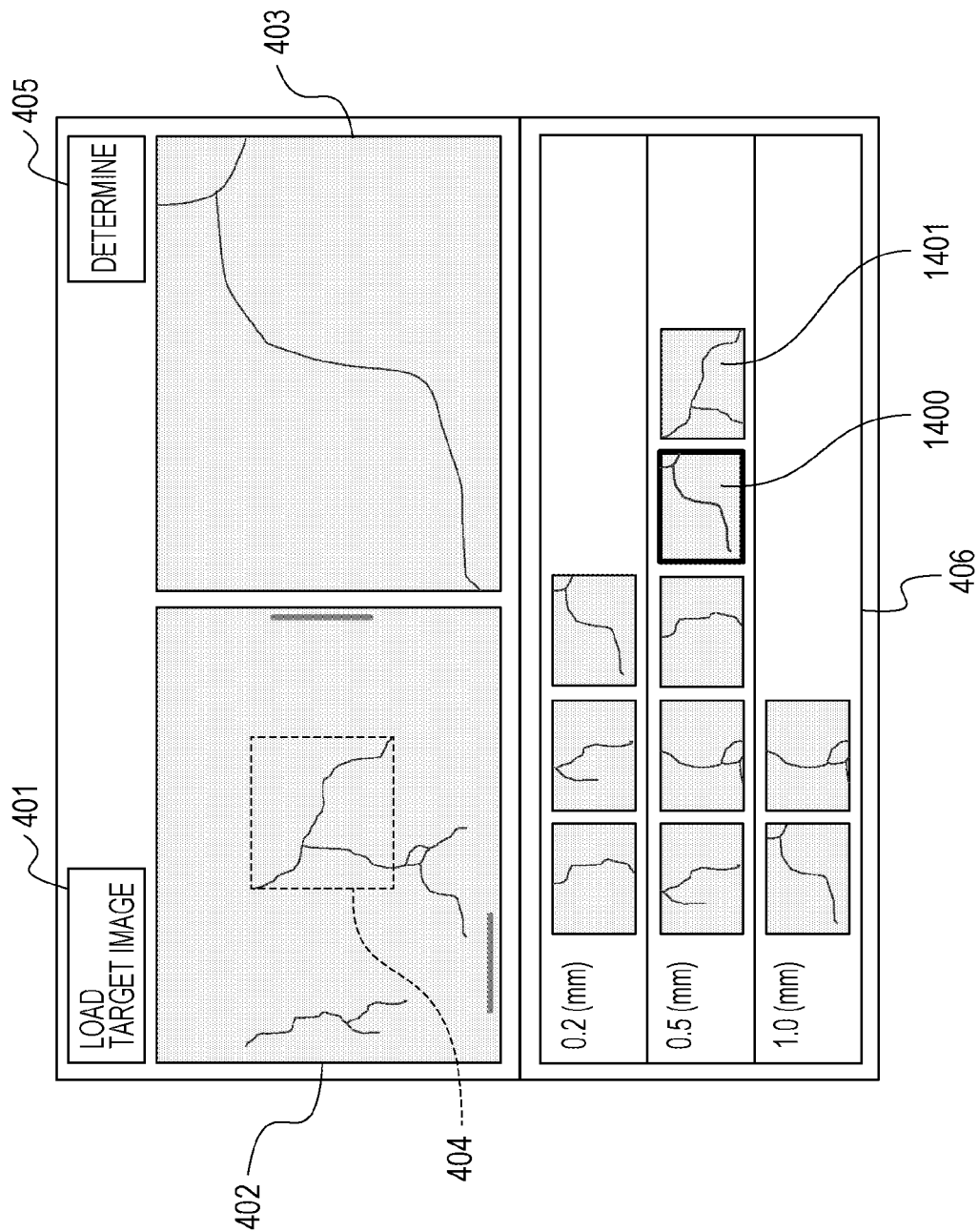
FIG. 14A is a diagram illustrating an example of display state transition.

Here, with reference to FIGS. 14A to 14D, exemplary transition of the display state of the display device 105 when the information processing apparatus of the present embodiment executes a structure inspection process will be described. FIGS. 14A to 14D illustrate changes in the display state in time series which occur when the user performs a structure inspection task using the screen illustrated in FIG. 4A. In FIG. 14A, as illustrated in FIG. 4A, the user sets a defect specifying area 404 in the target image display area 402. Here, a thumbnail image 1400 is selected as a reference image; as a result, a reference image based on the thumbnail image 1400 is displayed in the reference image display area 403. In FIG. 14A, the outer frame of the thumbnail image 1400, which is in a selected state, is made thicker to identifiably indicate other thumbnail images. Furthermore, it is assumed in FIG. 14A that the user operates the defect determination button 405, and the inside of the defect area specifying rectangle 404 registered as a crack having a width of 0.5 mm. As a result, a thumbnail mage 1401 is added to the reference information list area 406.

FIG. 14B illustrates a state in which, as the user further performs the task, a thumbnail image 1402, which is grouped as a defect having a width of 0.2 mm, is selected from the reference information list area 406. The outer frame of the thumbnail image 1402, which is in a selected state, is made thicker to identifiably indicate other thumbnail images. A reference image based on the selected thumbnail image 1402 is displayed in the reference image display area 403. Here, out of the entire reference image displayed in the reference image display area 403, an area cut out as the thumbnail image 1402 corresponds to the lower right-hand corner portion. In response to a change of the reference image, the zoom magnification of the target image is changed in the target image display area 402, and the target image is enlarged to be larger than that in the state illustrated in FIG. 14A. What is displayed as the target image in FIG. 14B corresponds to, of the target image displayed in FIG. 14A, a lower portion selected by the defect specifying area 404. When the user wants to do his/her task by paying attention to, for example, a defect having a thinner width than that in the state illustrated in FIG. 14A (reference is made to a defect with a width of 0.5 mm), the user selects the thumbnail image 1402, as in FIG. 14B, in order to perform comparison with a defect having a width of 0.2 mm. The information processing apparatus zooms in on the target image in response to selection of the thumbnail image 1402. As a result, the user is able to easily compare the thinner defect in the target image, to which the user newly pays attention, with the defect with a width of 0.2 mm at the same zoom magnification.

FIG. 14C illustrates a state in which the user newly sets a defect specifying area 1403 in the target image display area 402, presses the defect determination button 405, and registers a defect with a width of 0.2 mm. Accordingly, a thumbnail image 1404 is added to a 0.2-mm-width group in the reference information list area 406. The thumbnail image 1404 is a size-reduced image obtained by cutting out a portion surrounded by the defect specifying area 1403 from the target image. As described above, in the present embodiment, whenever a thumbnail image is selected from the reference information list area 406, a display parameter (such as a zoom magnification) in the target image display area 402 is changed. In addition, reference information is generated whenever a new defect is determined in the target image. At that time, in the display state, a character string for uniquely identifying reference information is added to the reference information list area 406.

Although the task of determining a defect with a width of 0.2 mm in a target image while referring to a reference image having a defect with a width of 0.2 mm is illustrated by way of example in FIGS. 14B and 14C, it is not always necessary to refer to a defect with the same width. For example, when comparing a target image with a reference image having a defect with a width of 0.5 mm, the user may recognize that a defect in the target image is thinner than the defect in the reference image, and, as a result, may determine that the defect has a width of 0.2 mm. In other words, at the time of adding a new thumbnail image to the reference information list, the new thumbnail image is not always added to the same group as a thumbnail image in a selected state.

Reference information newly generated in the present embodiment is selectable for reference in a later-performed defect determination task. For example, FIG. 14D illustrates a state in which the thumbnail image 1401, which is newly added in FIG. 14A, is selected. In the reference image display area 403, a partial image of a target image displayed at the time a defect is determined in the defect specifying area 404 in FIG. 14A is displayed as a reference image. At this time, in the target image display area 402, the target image is displayed at the zoom magnification of the target image displayed when a defect is determined in the defect specifying area 404 in FIG. 14A. As a result, in FIGS. 14A and 14D, the images displayed in the target image display area 402 and the reference image display area 403 appear exactly the same. However, the case is not limited to the above in the present embodiment. For example, in the reference image display area 403, a reference image whose center is an area cut out with the selected thumbnail image 1401 may be displayed. Alternatively, for example, in the target image display area 402, the position of a portion displayed to be centered on a partial image displayed immediately before the zoom magnification is changed may be adjusted.

In this manner, in the first embodiment, a new reference image may be generated from a target image on the basis of the result of defect determination performed by the user. This, according to the first embodiment, saves the time and labor of preparing a reference image for each type and degree of defect. In addition, in the first embodiment, the condition (environment) of the appearance of a target image and a defect image (reference image) determined in the past may be made uniform. Specifically, a display parameter of a target image and a display parameter of a reference image, which is part of the target image, are made equal in order to display the two images in an easier-to-compare state. In doing so, according to the first embodiment, a new defect may be determined by referring to a defect in a defect image (reference image) determined in the past, and the defect determination becomes consistent.

Second Embodiment

In the above-described first embodiment, the condition of the appearance of a target image is made uniform on the basis of reference information selected by the user. When the user performs an operation to change the appearance of a target image, that change does not affect a reference image. In contrast, in a second embodiment described hereinafter, the operation will be described in the case where, when how a target image is displayed changes due to a user operation such as changing the zoom magnification in the target image display area 402, that change is reflected in the mode of displaying a reference image. In other words, in the second embodiment, a process of adjusting a display parameter is performed in order to make the condition (environment) of the appearance of a reference image uniform on the basis of a target image.

Figure 8:
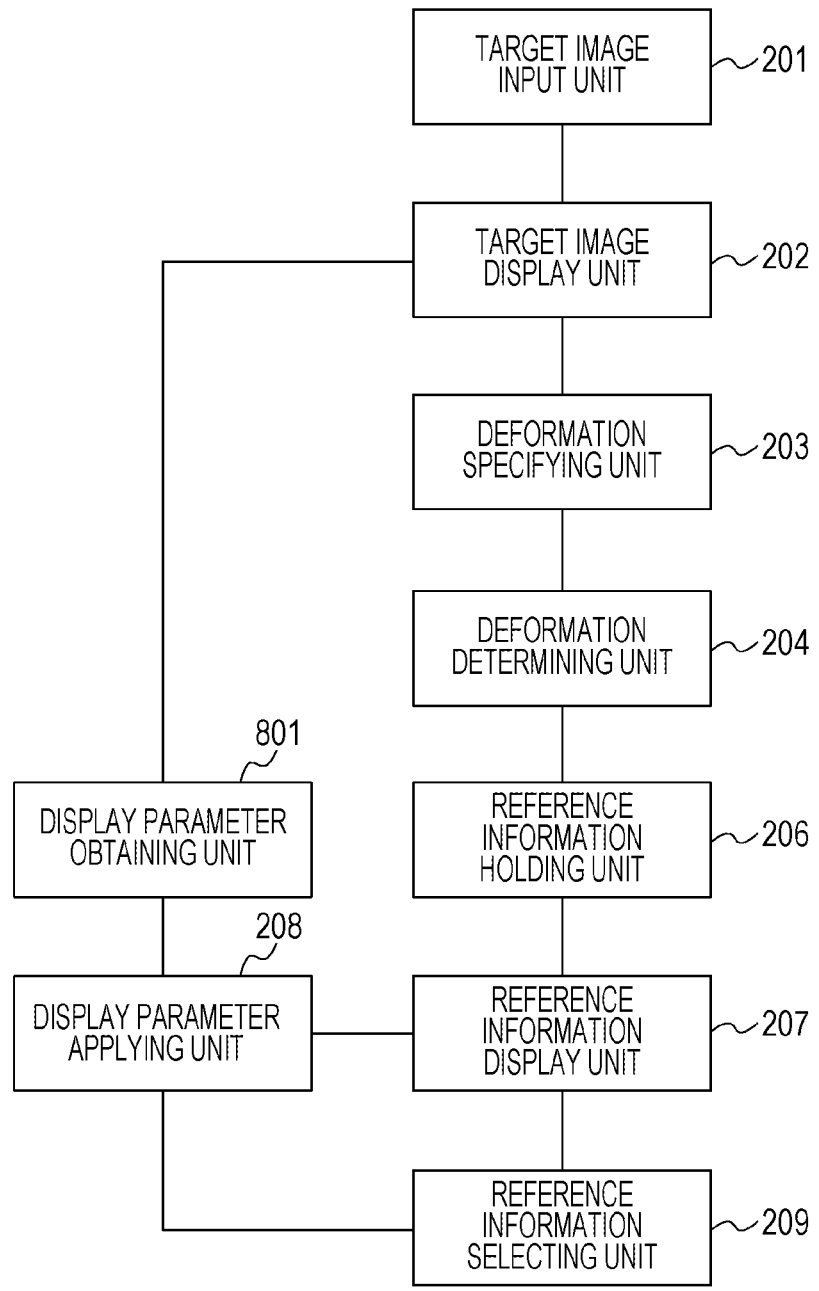
FIG. 8 is a diagram of functional blocks for performing a structure inspection process in a second embodiment.

FIG. 8 is a diagram illustrating functional blocks of the information processing apparatus of the second embodiment for realizing a structure inspection process. Because the target image input unit 201 to the defect determining unit 204 and the reference information holding unit 206 to the reference information selecting unit 209 are the same as those in FIG. 2, descriptions thereof are omitted. A display parameter obtaining unit 801 in the second embodiment obtains a display parameter from a target image or the target image display unit 202.

Figure 9A:
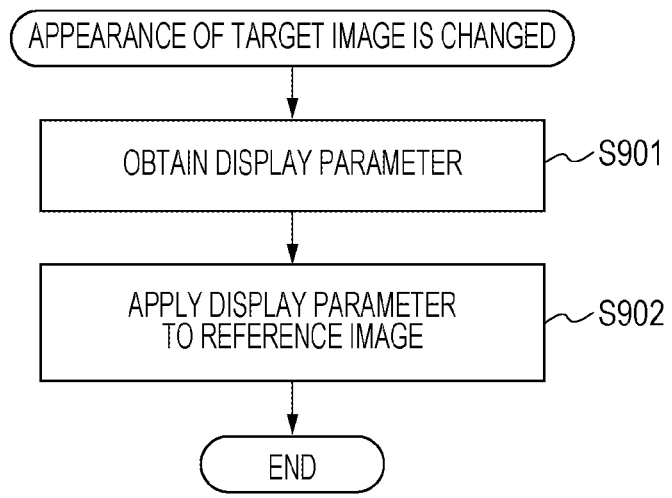
FIG. 9A is a flowchart of an image adjustment process in accordance with a user operation on a target image.
Figure 9B:
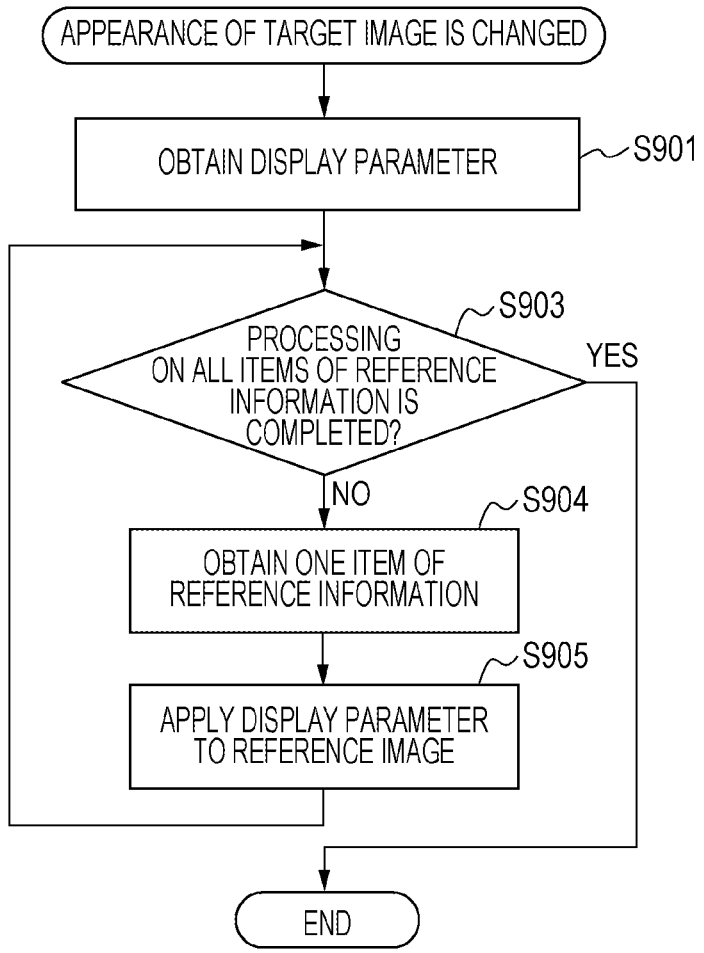
FIG. 9B is a flowchart of an image adjustment process in accordance with a user operation on a target image.

In addition, FIGS. 9A and 9B are flowcharts indicating two types of processes executed when how a target image is displayed changes due to a user operation in a structure inspection process performed by the information processing apparatus of the second embodiment. The processes indicated by the flowcharts in FIGS. 9A and 9B start when the user updates the parameter in the target image display area 402.

The flowchart illustrated in FIG. 9A indicates a process of making the appearance of a target image and a reference image uniform by applying the changed display parameter of the target image as a display parameter of one selected reference image.

In S901, the display parameter obtaining unit 801 obtains the present display parameter set in the target image display unit 202. In the second embodiment, the display parameter is also, for example, a zoom magnification, a brightness adjustment value, a hue adjustment value, or a gamma value. Next, in S902, the display parameter applying unit 208 changes the zoom magnification of a reference image displayed by the reference information display unit 207 to the zoom magnification obtained in S901.

Figure 15A:
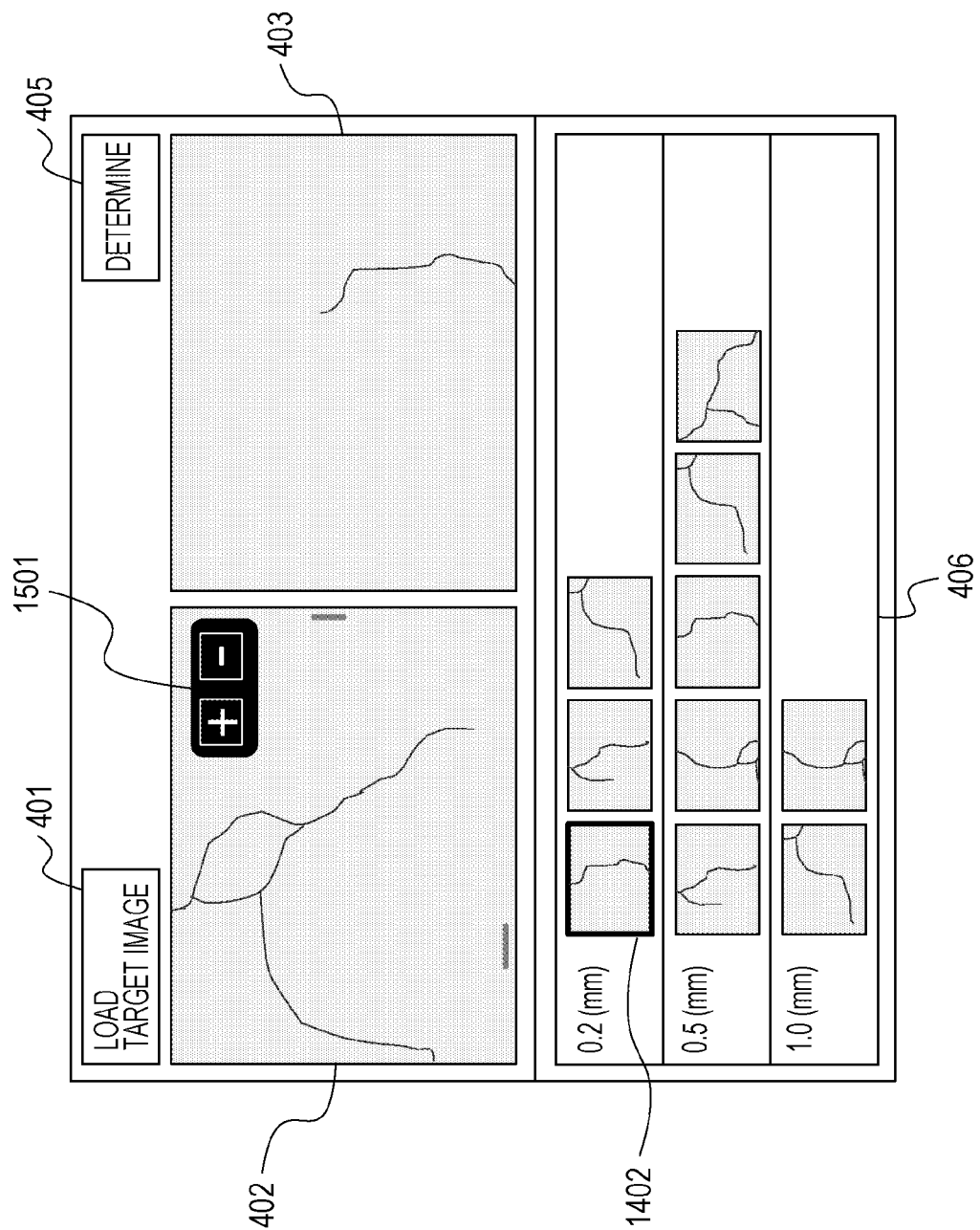
FIG. 15A is a diagram illustrating an example of display state transition.

Here, with reference to FIGS. 15A to 15D, exemplary transition of the display state of the display device 105 when the process of the flowchart illustrated in FIG. 9A is executed will be described. FIGS. 15A and 15B illustrate changes in the display state in time series which occur in response to execution of the process of the flowchart illustrated in FIG. 9A when the user performs a structure inspection task in the second embodiment. FIG. 15A illustrates the same state as that illustrated in FIG. 14B. A reference image based on the thumbnail image 1402 in a selected state is displayed in the reference image display area 403. In addition, in FIG. 15A, a zoom magnification change button 1501 is displayed in the target image display area 402. The zoom magnification change button 1501 is an example of a display parameter operating interface, which may be called in response to a certain operation such as clicking or double tapping in the target image display area 402. By operating the zoom magnification change button 1501, the user may arbitrarily change the zoom magnification of the target image.

FIG. 15B illustrates a state in which the inside of the target image display area 402 is further zoomed in in response to a user operation. In the present embodiment, in response to a user operation on the target image, the same change in the display parameter as that of the target image is reflected in the reference image display area 403. In the case of FIG. 15B, the reference image is also zoomed in. In the present embodiment, in the case of adding a process of zooming in on (enlarging) the reference image, position adjustment is performed such that the already-determined defect will always be included in a displayed partial area in order that the user will not lose sight of the defect in the reference image. As a result, a defect cut out with the thumbnail image 1402 is enlarged and displayed in the reference image display area 403 in FIG. 15B.

The flowchart illustrated in FIG. 9B indicates a process of applying the changed display parameter of the target image to not only the selected reference image but also all items of reference information included in the displayed information list. However, in the description of FIG. 9B, it is assumed that the reference information list includes thumbnail images obtained by, without trimming, reducing the size of or enlarging reference images obtained on the basis of items of reference information.

Since the processing in S901 of FIG. 9B is the same as the processing in S901 of FIG. 9A, a description thereof omitted.

Next, in S903, the reference information selecting unit 209 determines whether the processing in S904 and S905, which are later steps, is completed for all items of reference information stored in the reference information holding unit 206. If the reference information selecting unit 209 determines in S903 that the processing is completed, the process of the flowchart illustrated in FIG. 9B ends. In contrast, if the reference information selecting unit 209 determines in S903 that the processing is not completed, the process proceeds to S904.

In S904, the reference information selecting unit 209 obtains, from the reference information holding unit 206, one item of reference information for which the processing in S904 and S905, which are later steps, is not completed.

Next, in S905, the reference information selecting unit 209 obtains a reference image using the method described in S603 or the like on the basis of the reference information obtained in S904. The reference information selecting unit 209 applies a scale transformation matrix generated on the basis of the zoom magnification obtained in S901 to the reference image, and then resizes the reference image to the size of a thumbnail image. However, this method involves two resize processes, resulting in an increase in the amount of calculation. Therefore, the zoom magnification obtained in step S901 and a scale factor for thumbnailing, which is obtained from the size ratio of the reference image and a thumbnail image, may be combined to involve only one resize process.

Alternatively, in response to selection of a thumbnail image from the reference information list after the process of the flowchart illustrated in FIG. 9B is completed, the process of the flowchart illustrated in FIG. 9A may be executed.

Here, with reference to FIGS. 15C and 15D, exemplary transition of the display state of the display device 105 when the process of the flowchart illustrated in FIG. 9B is executed will be described. FIGS. 15C and 15D illustrate changes in the display state in time series which occur in response to execution of the process of the flowchart illustrated in FIG. 9A when the user performs a structure inspection task. The state of the target image display area 402 in FIG. 15C is the same as that in FIG. 15A. A reference image based on a thumbnail image 1503 in a selected state is displayed in the reference image display area 403. Here, a reference image corresponding to the thumbnail image 1503 is the same as that for the thumbnail image 1402 in FIG. 15A. Note that, in FIG. 15C, thumbnail images displayed in the reference information list area 406 are size-reduced versions of the reference images themselves. In this case, the user may also arbitrarily change the zoom magnification of the target image by operating the zoom magnification change button 1501.

FIG. 15D illustrates a state in which the inside of the target image display area 402 is further zoomed in in response to a user operation. In the present embodiment, in response to a user operation on the target image, each of the thumbnail images displayed in the reference information list area 406 is zoomed in. In the case of FIG. 15D, the reference image is also zoomed in by applying the process illustrated in FIG. 9A.

As described above, according to the information processing apparatus of the second embodiment, the appearance of the reference image may always be made uniform to match that of the target image on the basis of a user operation on the target image, which enables the user to quickly determine a defect.

Third Embodiment

In the above-described first embodiment, a reference image is generated from a target image being displayed. In contrast, in a third embodiment, it is configured to load reference information generated in the past (including the case of loading from the outside). Here, originally, when photographing a deformed portion, it recommended to take a photograph at a certain resolution; however, this is not always satisfied depending on the situation of the photographing site. In the case of loading reference information generated in the past, as in the third embodiment, the resolution of a reference image based on the loaded reference information may be different from the resolution of a photographed target image. When the target image and the reference image have different resolutions as described here, it is difficult to make uniform how the two images are displayed simply by matching the zoom magnification.

Figure 10:
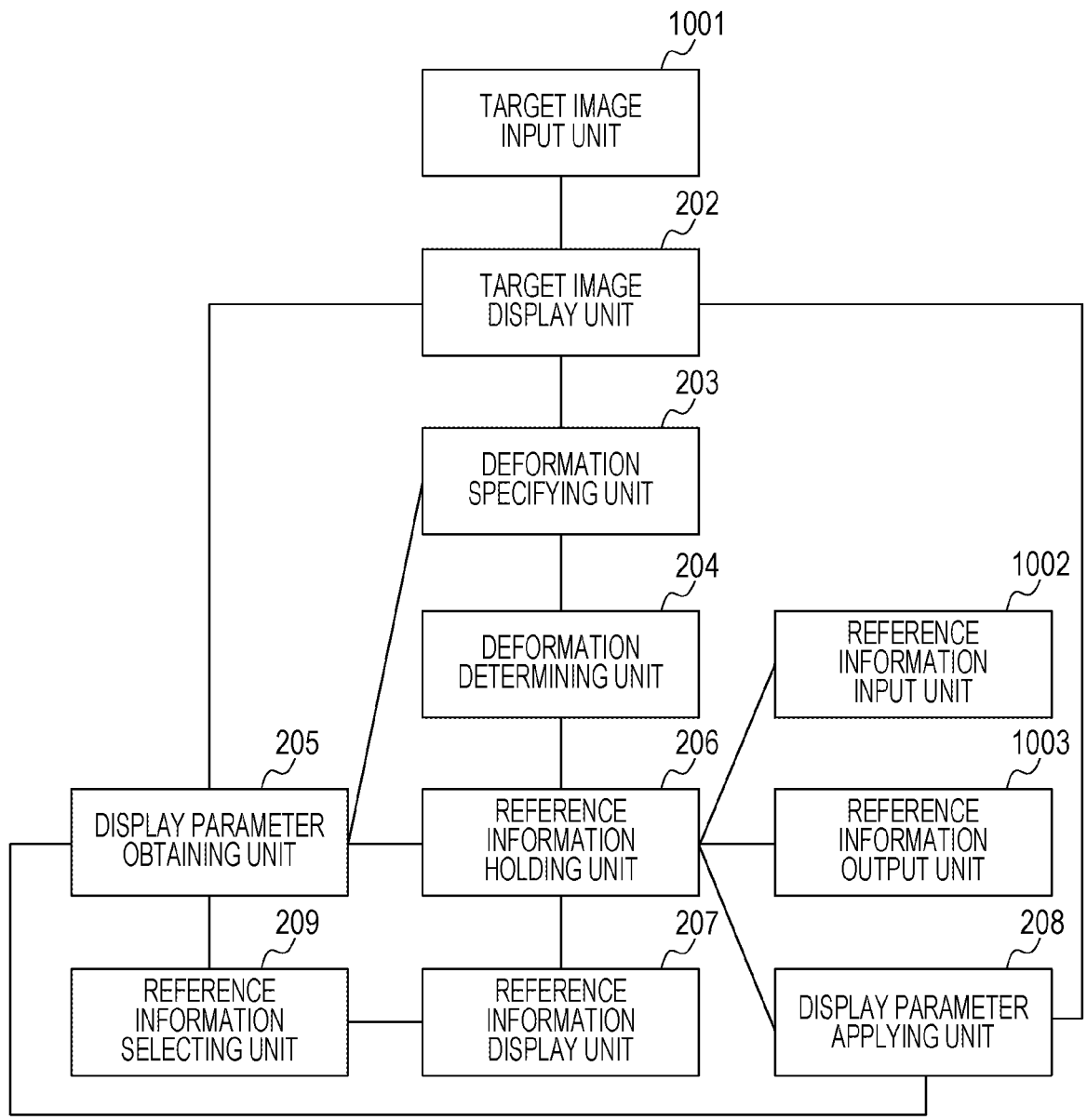
FIG. 10 is a diagram of functional blocks for performing a structure inspection process in a third embodiment.

FIG. 10 is a diagram illustrating functional blocks of the information processing apparatus of the third embodiment for realizing a structure inspection process. Because the target image display unit 202 to the reference information selecting unit 209 are the same as those in FIG. 2, descriptions thereof are omitted.

In FIG. 10, a target image input unit 1001 obtains a target image from the HDD 107 or the NET IF 104. At that time, the target image input unit 1001 asks the user of the resolution (in units of pixel/mm) of a to-be-input target image. The resolution of a target image input by the user is held as temporary data (for example, held in a certain area of the RAM 102) while the target image is being displayed by the target image display unit 202.

A reference information input unit 1002 obtains reference information from the HDD 107 or the NET IF 104. The reference information in this case may be saved as a file or stored in a database. In order to input appropriate reference information for a to-be-inspected target image, a plurality of items of reference information may be structured to be searchable. In this case, the reference information input unit 1002 has a search function of conducting a search using the type and degree of defect included in reference information, for example. In addition, the type and material of a structure where a defect appears, the position at which the defect appears, and a person who has determined the defect may be used as search keys in this case. Reference information obtained by the reference information input unit 1002 is temporarily held by, for example, the reference information holding unit 206.

A reference information output unit 1003 outputs reference information newly generated by the information processing apparatus of the third embodiment to the HDD 107 or the NET IF 104. Note that the output reference information may be saved as a file or stored in a database.

FIG. 11 illustrates an example of a reference information table managed by the reference information holding unit 206 in the third embodiment. Because the reference ID item 301 to the display parameter item 306 are the same as those in FIG. 3, descriptions thereof are omitted. An image path item 1101 and a resolution item 1102 are prepared in the reference information table illustrated in FIG. 11. A path indicating an image including a to-be-referenced defect is described in the image path item 1101. The resolution of an image indicated by the path in the image path item 1101 (an image including a to-be-referenced defect) is described in the resolution item 1102.

Figure 12:
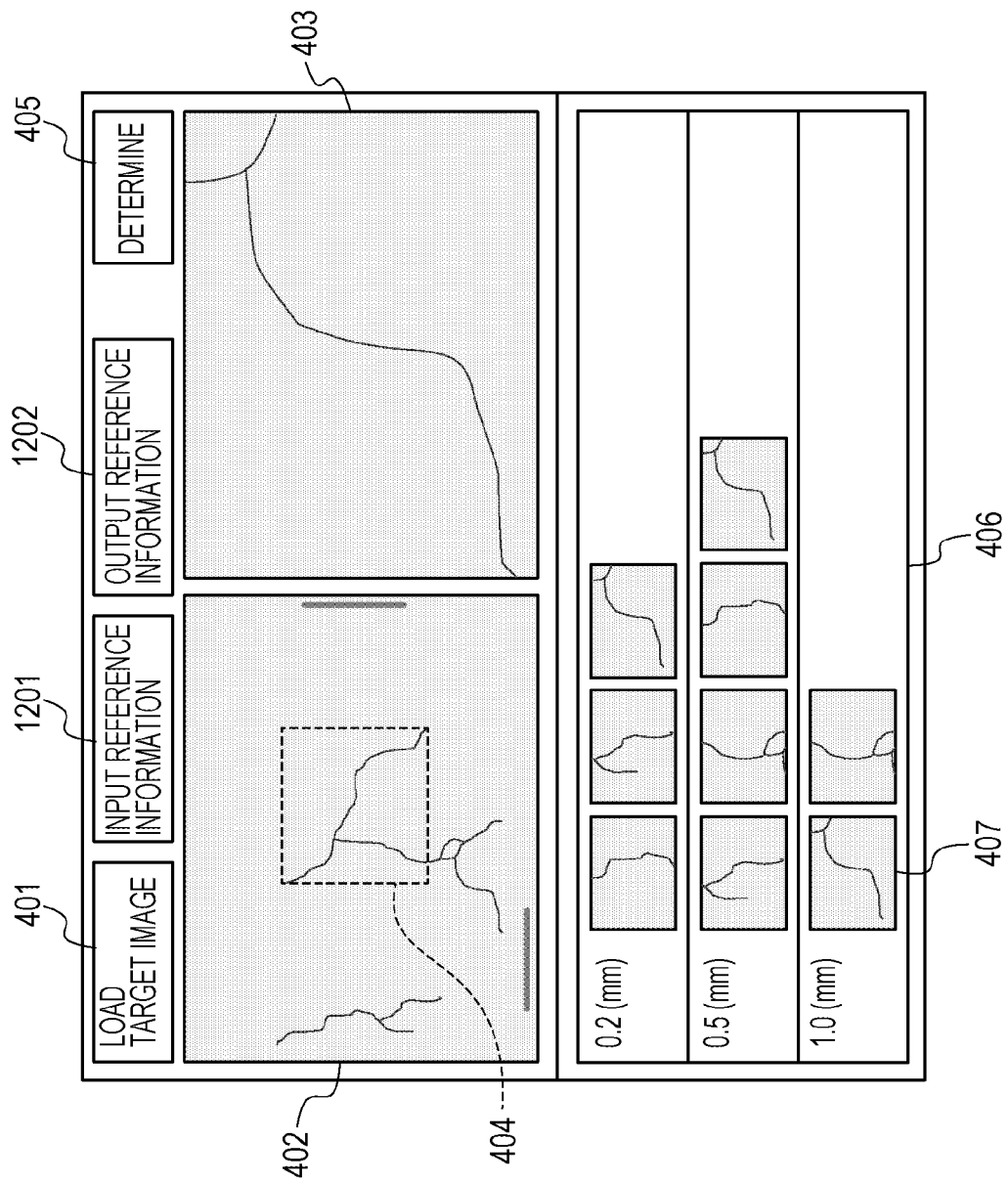
FIG. 12 is a diagram describing a screen configuration in the third embodiment.

FIG. 12 illustrates an example of a display screen of the information processing apparatus of the third embodiment. Because the target image loading button 401 to the reference thumbnail image 407 are the same as those in FIG. 4, descriptions thereof are omitted.

A reference information input button 1201 is a button operated by the user when inputting reference information using the reference information input unit 1002.

A reference information output button 1202 is a button operated by the user when outputting reference information using the reference information output unit 1003.

Figure 13:
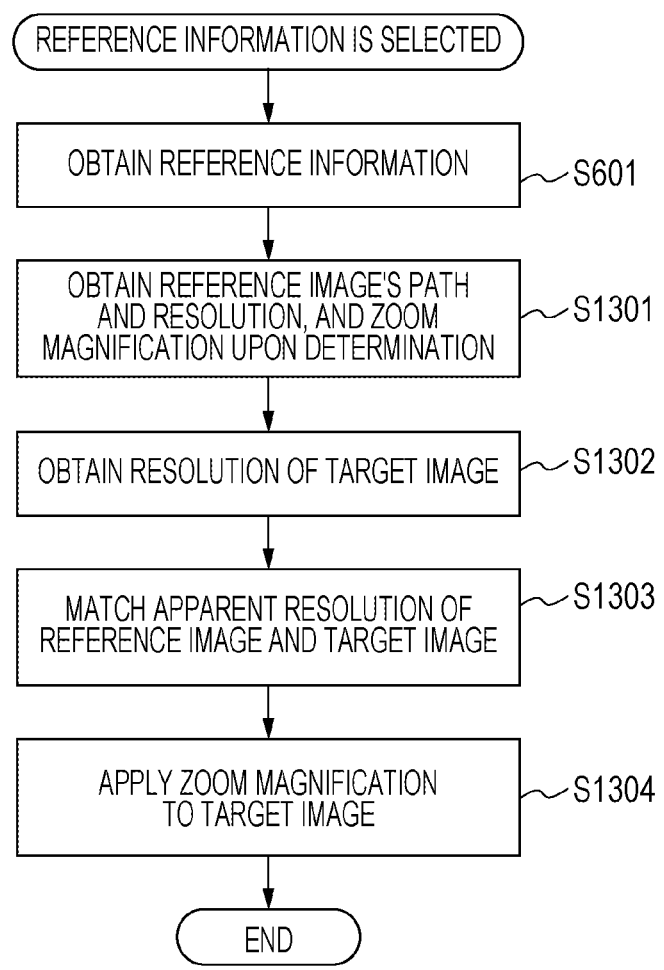
FIG. 13 is a flowchart of an image adjustment process in the third embodiment.

FIG. 13 is a flowchart describing a process executed when reference information is selected from a list of items of reference information generated in the past in a structure inspection process realized by the information processing apparatus of the present embodiment. Because S601 is the same as that corresponding step in FIG. 6, a description thereof is omitted. In the case of the flowchart of FIG. 13, after S601, the process proceeds to the processing in S1301.

In S1301, the reference information selecting unit 209 obtains the path and resolution of an image including a defect, and the zoom magnification at the time the defect is determined, from reference information selected by the user.

Next, in S1302, the target image display unit 202 obtains the resolution of the displayed target image. It is assumed that the resolution of the target image is held as temporary data that accompanies the target image being displayed by the target image display unit 202.

Next, in S1303, the target image display unit 202 matches the appearance (the apparent resolution) of the displayed target image and the displayed appearance (the apparent resolution) of the image whose path, resolution, and zoom magnification are obtained in S1301 (a reference image identified in an image including a defect). Specifically, the target image display unit 202 applies a scale factor obtained by later-described equation (1) to one of the two images with a higher resolution.

Here, assuming that the resolution obtained in S1301 is $res_a$ and the resolution obtained in S1302 is $res_b$, a scale factor $S_1$ of the image size is obtained as:

$$S_1 = \begin{cases} res_b/res_a (res_a > res_b) \\ res_a/res_b (res_a < res_b) \end{cases} \quad (1)$$

Here, the displayed appearance (apparent resolution) of one image with a higher resolution is appropriately scaled to match that of the other image. Alternatively, the displayed apparent resolution of one image with a lower resolution may be appropriately scaled to match that of the other image. In that case, a scale factor $S_2$ obtained by equation (2) below may be applied to the image with a lower resolution:

$$S_2 = \begin{cases} res_a/res_b (res_a > res_b) \\ res_b/res_a (res_a < res_b) \end{cases} \quad (2)$$

Next, after the display parameter applying unit 208 adjusts the displayed appearance (apparent resolution) of the two images to be uniform in S1303, the display parameter applying unit 208 applies in S1304 the zoom magnification obtained in S1301 to the target image displayed by the target image display unit 202.

As described above, in the third embodiment, reference information generated when another user performed an inspection task using the information processing apparatus of the present embodiment may be utilized. This, according to the third embodiment, allows reference information generated by a user who is skilled in inspection tasks (expert) to be usable by an unskilled novice user (beginner), and even a beginner may perform a determination according to an expert's determination criterion.

Although how a target image is displayed is made uniform with that of a reference image in the third embodiment, needless to say, how a reference image is displayed may be made uniform with that of a target image. The processing in this case is basically as described with reference to the flowchart illustrated in FIG. 9A or 9B; however, as in S1303, it is necessary to match in advance the apparent resolution of two images. Although the third embodiment has discussed the example in which a list of items of reference information generated in the past is displayed and one item of reference information is selected from the list, items of reference information displayed as a list may include both reference information generated in the past and reference information newly generated from a target image, as in the above-described embodiments.

As described above, according to the above-described embodiments of the present invention, a reference image to which reference is made when determining a defect may be automatically generated on the basis of the result of defect determination performed by the user. According to the embodiments, comparison of a to-be-inspected image and a reference image for determining a defect may be facilitated by matching the appearance of the two images.

Other Embodiments

The present invention may be realized by a process of supplying a program realizing one or more functions of the above-described embodiments to a system or an apparatus via a network or a storage medium, and reading and executing the program by one or more processors included in the system or apparatus. The present invention may be realized by a circuit that realizes one or more functions (such as an application-specific integrated circuit (ASIC)).

According to the present invention, time and labor spent prior to inspection work may be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus for supporting a task performed by a user for identifying a defect in an object based on a target image that is a photographed image of the object, comprising:
   a selecting unit that selects, based on an input given by the user, one from one or more reference images to which reference is made in the task performed by the user for identifying a defect in the object;
   a display unit that comparably displays the target image and the selected reference image on a certain display device;
   a specifying unit that receives an operation performed by the user for specifying a defect in the target image displayed by the display unit;
   a generating unit that generates a new reference image based on a partial area, of the target image, including the specified defect;
   an obtaining unit that obtains a display parameter regarding representation, on the display device, of the reference image selected by the selecting unit; and
   an adjusting unit that adjusts a display parameter regarding representation, on the display device, of the target image based on the display parameter obtained by the obtaining unit,
   wherein the new reference image generated by the generating unit is added to the one or more reference images selectable by the selecting unit, and
   wherein the display unit comparably displays the target image and the reference image in a state in which the display parameter adjusted by the adjusting unit is reflected.

2. The information processing apparatus according to claim 1, wherein the display parameter includes at least one of a zoom magnification, a brightness adjustment value, a hue adjustment value, a gamma value, and a resolution of an image.

3. The information processing apparatus according to claim 1, wherein:

the target image displayed on the display device is at least a partial area of a photograph of a structure serving as the object of the task, and an area displayed as the target image is changeable in response to at least one of scrolling, zooming in, and zooming out performed by the user, and the generating unit associates a zoom magnification of the area displayed as the target image at a time point at which a defect included in the area displayed as the target image is specified by the specifying unit as a display parameter regarding the new reference image with the reference image.

4. The information processing apparatus according to claim 1, wherein:

the reference image is a partial area identified in the target image based on reference information, and the reference information is information that includes information representing a position and a size of the defect, information representing a type of the defect, and information representing a degree of the defect, and is information representing the defect included in the target image.

5. The information processing apparatus according to claim 4, wherein the reference image corresponds to an image displayed as the target image on the display device when an operation performed by the user for specifying a defect included in the reference image is received by the specifying unit.

6. The information processing apparatus according to claim 5, wherein:

the specifying unit obtains information representing a type and a degree, input by the user, of the specified defect, and the generating unit generates the reference information based on the information, obtained by the specifying unit, representing the type and the degree of the defect.

7. The information processing apparatus according to claim 5, wherein the selecting unit selects the reference image based on an input given by the user for selecting one of thumbnail images representing items of the reference information displayed as a list on the display device.

8. The information processing apparatus according to claim 7, wherein each of the thumbnail images displayed as a list on the display device corresponds to a size-reduced image obtained by trimming a portion, of the reference image, where a defect is specified.

9. The information processing apparatus according to claim 7, further comprising:

a sorting unit that sorts items of the reference information displayed as a list based on at least one of the type and the degree of the defect.

10. The information processing apparatus according to claim 7, further comprising:

a grouping unit that groups items of the reference information displayed as a list based on at least one of the type and the degree of the defect.

11. The information processing apparatus according to claim 10, wherein:

reference information for identifying a reference image newly generated by the generating unit is added to an end of one of groups whose grouping is done by the grouping unit in the list.

12. The information processing apparatus according to claim 5, wherein the selecting unit selects the reference image based on an input given by the user for selecting one of character strings representing items of the reference information displayed as a list on the display device.

13. The information processing apparatus according to claim 1, wherein:

the reference image is an area identified, based on reference information, in an image serving as a source from which the reference information is generated, and the reference information is information that includes information representing a path representing the image serving as the source from which the reference information is generated, information representing a position and a size of the defect, information representing a type of the defect, and information representing a degree of the defect, and is information representing a defect included in the image serving as the source from which the reference information is generated.

14. The information processing apparatus according to claim 1, wherein the display unit comparably displays the target image and the reference image by displaying the target image and the reference image side by side on the display device.

15. The information processing apparatus according to claim 1, wherein the display unit comparably displays the target image and the reference image by switchably displaying the target image and the reference image every certain period of time in an identical area of the display device.

16. The information processing apparatus according to claim 1, wherein the defect includes at least one of cracks, delamination, spalling, efflorescence, cold joints, rock pockets, surface air voids, sand streaks, rust fluids, which occur on a surface of the object.

17. An information processing method executed by an information processing apparatus for supporting a task performed by a user for identifying a defect in an object based on a target image that is a photographed image of the object, comprising:

selecting, based on an input given by the user, one from one or more reference images to which reference is made in the task performed by the user for identifying a defect in the object;

comparably displaying the target image and the selected reference image on a certain display device;

receiving an operation performed by the user for specifying a defect in the displayed target image;

generating a new reference image based on a partial area, of the target image, including the specified defect;

obtaining a display parameter regarding representation, on the display device, of the selected reference image;

adjusting a display parameter regarding representation, on the display device, of the target image based on the obtained display parameter;

adding the newly generated reference image to the one or more reference images selectable in the selecting; and comparably displaying the target image and the reference image in a state in which the adjusted display parameter is reflected.

18. A non-transitory computer-readable medium storing instructions that, when executed by a computer, cause the computer to function as:

a selecting unit that selects, based on an input given by the user, one from one or more reference images to which reference is made in a task performed by a user for identifying a defect in an object based on a target image that is a photographed image of the object;

a display unit that comparably displays the target image and the selected reference image on a certain display device;

a specifying unit that receives an operation performed by the user for specifying a defect in the target image displayed by the display unit;

a generating unit that generates a new reference image based on a partial area, of the target image, including the specified defect;

an obtaining unit that obtains a display parameter regarding representation, on the display device, of the reference image selected by the selecting unit; and an adjusting unit that adjusts a display parameter regarding representation, on the display device, of the target image based on the display parameter obtained by the obtaining unit, wherein the new reference image generated by the generating unit is added to the one or more reference images selectable by the selecting unit, and wherein the display unit comparably displays the target image and the reference image in a state in which the display parameter adjusted by the adjusting unit is reflected.

19. An information processing apparatus for supporting a task performed by a user for identifying a defect in an object based on a target image that is a photographed image of the object, comprising:

a selecting unit that selects, based on an input given by the user, one from one or more reference images to which reference is made in the task performed by the user for identifying a defect in the object;

a display unit that comparably displays the target image and the selected reference image on a certain display device;

a specifying unit that receives an operation performed by the user for specifying a defect in the target image displayed by the display unit;

a generating unit that generates a new reference image based on a partial area, of the target image, including the specified defect;

an obtaining unit that obtains a display parameter regarding representation, on the display device, of the target image; and an adjusting unit that adjusts a display parameter regarding representation, on the display device, of the reference image based on the display parameter obtained by the obtaining unit, wherein the new reference image generated by the generating unit is added to the one or more reference images selectable by the selecting unit, and wherein the display unit comparably displays the target image and the reference image in a state in which the display parameter adjusted by the adjusting unit is reflected.

20. The information processing apparatus according to claim 19, wherein the display parameter includes at least one of a zoom magnification, a brightness adjustment value, a hue adjustment value, a gamma value, and a resolution of an image.

21. An information processing method executed by an information processing apparatus for supporting a task performed by a user for identifying a defect in an object based on a target image that is a photographed image of the object, the method comprising:

selecting, based on an input given by the user, one from one or more reference images to which reference is made in the task performed by the user for identifying a defect in the object;

comparably displaying the target image and the selected reference image on a certain display device;

receiving an operation performed by the user for specifying a defect in the displayed target image;

generating a new reference image based on a partial area, of the target image, including the specified defect;

obtaining a display parameter regarding representation, on the display device, of the target image;

adjusting a display parameter regarding representation, on the display device, of the reference image based on the obtained display parameter;

adding the newly generated reference image to the one or more reference images selectable in the selecting; and comparably displaying the target image and the reference image in a state in which the adjusted display parameter is reflected.

22. A non-transitory computer-readable medium storing instructions that, when executed by a computer, cause the computer to function as:

a selecting unit that selects, based on an input given by the user, one from one or more reference images to which reference is made in a task performed by a user for identifying a defect in an object based on a target image that is a photographed image of the object;

a display unit that comparably displays the target image and the selected reference image on a certain display device;

a specifying unit that receives an operation performed by the user for specifying a defect in the target image displayed by the display unit;

a generating unit that generates a new reference image based on a partial area, of the target image, including the specified defect;

an obtaining unit that obtains a display parameter regarding representation, on the display device, of the target image; and an adjusting unit that adjusts a display parameter regarding representation, on the display device, of the reference image based on the display parameter obtained by the obtaining unit, wherein the new reference image generated by the generating unit is added to the one or more reference images selectable by the selecting unit, and wherein the display unit comparably displays the target image and the reference image in a state in which the display parameter adjusted by the adjusting unit is reflected.

* * * * *